United States Patent
Neu et al.

(10) Patent No.: US 11,360,010 B1
(45) Date of Patent: Jun. 14, 2022

(54) METHODS AND DEVICE FOR CONTROLLED CELL STRETCH AND IMAGING

(71) Applicant: The Regents of the University of Colorado, a body, Denver, CO (US)

(72) Inventors: Corey P. Neu, Boulder, CO (US); Benjamin Seelbinder, Boulder, CO (US); Adrienne K. Scott, Boulder, CO (US); Isabel Nelson, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 0 days.

(21) Appl. No.: 16/933,596

(22) Filed: Jul. 20, 2020

Related U.S. Application Data

(60) Provisional application No. 62/876,535, filed on Jul. 19, 2019.

(51) Int. Cl.
  *G01N 3/10* (2006.01)
  *G01N 3/06* (2006.01)

(52) U.S. Cl.
  CPC .............. *G01N 3/10* (2013.01); *G01N 3/068* (2013.01)

(58) Field of Classification Search
  CPC .................................. G01N 3/10; G01N 3/068
  USPC ............................................................ 73/800
  See application file for complete search history.

(56) References Cited

U.S. PATENT DOCUMENTS

| | | | | |
|---|---|---|---|---|
| 4,706,685 A | * | 11/1987 | Jones, Jr. | A61B 5/0935 600/538 |
| 6,057,150 A | * | 5/2000 | Lee | C12M 23/48 435/288.3 |
| 6,107,081 A | * | 8/2000 | Feeback | A61B 5/1108 435/284.1 |
| 2010/0144007 A1 | * | 6/2010 | Bryant | B30B 1/14 435/182 |
| 2017/0191469 A1 | * | 7/2017 | Dom | F03G 7/06 |
| 2019/0390152 A1 | * | 12/2019 | Li | C12M 41/48 |

FOREIGN PATENT DOCUMENTS

| | | | |
|---|---|---|---|
| JP | 2010127266 | * | 6/2010 |
| SU | 1413346 A1 | * | 7/1988 |

* cited by examiner

*Primary Examiner* — Octavia Davis Hollington
(74) *Attorney, Agent, or Firm* — Michael M. McGaw; McGaw Law, P.C.

(57) ABSTRACT

A low-cost, magnetically-driven device that enables visualization and quantification of dynamic changes in cell behavior during mechanical stretch. Using this device, it was observed that nuclei of mouse embryonic skin fibroblasts underwent rapid but divergent responses to strain magnitude, showing nuclear area increase and chromatin decompaction during 5% (low) strain, but nuclear area decrease and chromatin condensation during 20% (high) strain. Only responses to low strain were dependent on calcium, while actin inhibition abrogated any nuclear response and increased stretch-induced DNA damage. Stretch-activation revealed a shift in actin filaments away from (low strain) or towards (high strain) the nuclear periphery. The findings suggest that different pathways control strain level-dependent cell behavior and that mechanical confinement of nuclei through actin may be a protective mechanism during high strain loads.

14 Claims, 26 Drawing Sheets

METHODS AND DEVICE FOR CONTROLLED CELL STRETCH AND IMAGING

CROSS-REFERENCE TO RELATED APPLICATIONS

This application claims the benefit of U.S. Provisional Application No. 62/876,535, filed Jul. 19, 2019.

STATEMENT OF GOVERNMENT INTEREST

This invention was made with government support under grant number CMMI 1349735, awarded by the National Science Foundation. The government has certain rights in the invention.

FIELD OF INVENTION

This invention relates to methods and devices for controlled cell stretch and imaging.

BACKGROUND OF THE INVENTION

Mechanical cues from the environment are known to have a profound impact on cell fate and cell behavior, a phenomena referred to as mechanosensation. Changes in mechanical properties due to trauma, chronic conditions, or genetic predispositions lead to cellular degeneration and result in a range of pathologies. Understanding the mechanisms involved in mechanosensation would allow researchers to direct cell differentiation and behavior to generate artificial tissues for drug testing or organ repair.

The nucleus is thought to be an essential mechanosensitive organelle because it is tightly connected to all parts of the cytoskeleton through linker of nucleo- and cytoskeleton (LINC) complexes. Cyclic stretch changes nuclear morphology, induces chromatin condensation, increases mechanical resistance of nuclei, and alters gene expression. Disruption of LINC complexes inhibits stretch-induced changes in chromatin remodeling and gene expression, suggesting that strain transfer from the cytoskeleton plays an important role for nuclear mechanosensation. The actin skeleton, in particular, is crucial for nuclear responses to dynamic mechanical stimulation. Despite these findings, the underlying mechanisms of cellular and nuclear mechanosensation pathways are unclear, partially because of a lack of accessible methods to image cell behavior under mechanical stimulation in real time.

Nuclear responses to mechanical stimulation occur within seconds. This highlights the importance of simultaneous stimulation and data acquisition to understand these processes. However, commercially available cell-stretch devices do not allow for the use of high-magnification objectives necessary to elucidate single cell behavior. In addition, custom-built devices either lack high-resolution live imaging capability or use expensive components, such as precise linear actuators or optical traps. In addition, designs are often complicated and require special expertise, which makes them difficult to replicate for widespread use. The present invention provides devices and methods to overcome many of the aforementioned limitations.

SUMMARY OF THE INVENTION

A low-cost, magnetically-driven device that enables visualization and quantification of dynamic changes in cell behavior during mechanical stretch. Using this device, we observed that nuclei of mouse embryonic skin fibroblasts underwent rapid but divergent responses to strain magnitude, showing nuclear area increase and chromatin decompaction during 5% (low) strain, but nuclear area decrease and chromatin condensation during 20% (high) strain. Only responses to low strain were dependent on calcium, while actin inhibition abrogated any nuclear response and increased stretch-induced DNA damage. Stretch-activation revealed a shift in actin filaments away from (low strain) or towards (high strain) the nuclear periphery. Our findings suggest that different pathways control strain level-dependent cell behavior and that mechanical confinement of nuclei through actin may be a protective mechanism during high strain loads.

A custom-built device was designed to acquire high-magnification and dynamic images of cells during the application of equiaxial strain while also avoiding the use of expensive materials (Table 1) or complex designs. Two types of 3D printers were used to print a majority of the components: Objet30 (Computer Aided Technology) using the material VeroClear (OBJ-04055, Computer Aided Technology) and the uPrint SE Plus (311-20200, Computer Aided Technology, Inc) using ABS+. Designs for the device components were created as CAD files (FIG. 7a) using SolidWorks (Dassault Systèmes SolidWorks, v. 2018). All parts were printed at the Integrated Teaching and Learning Laboratory (ITLL) at the University of Colorado Boulder.

The main body consisted of four parts: a deformation ring holder, an electromagnet case, a slider tube and a piston (FIG. 1A, FIG. 7b), which were printed using the uPrint SE Plus. The deformation ring holder was designed to fit into the circular notch of the manual stage of a Nikon Eclipse Ti Microscope (by interlocking with two metal wings that otherwise hold the aluminum sample tray) and contained an adapter that encased the microscope objective and held the deformation ring. Within the encasement, the objective had a moving range of approximately 8 mm in each direction. The deformation ring was machined from Delrin® Acetal Resin (8572K27, McMaster-Carr) to provide a friction-reduced interface with the silicone membrane. The slider tube fit tightly into the electromagnetic coil and contained 3 slider rails (NS-01-27, Igus) for friction-reduced vertical movement of the piston, which in turn contained 3 matching slider carriages (NW-02-27, Igus). A rare earth magnet (R3525, SuperMagnetMan) was attached to the top of the piston to transmit force from the electromagnet below.

The stretch chamber consisted of three parts: a main chamber, a membrane ring and holding clips (FIG. 7c), which were printed using the Objet30. The stretch chamber was assembled by placing a 60×60 mm silicon elastomer membrane (gloss 0.005", Specialty Manufacturing Inc.) straight onto the elevated inner edge of the main chamber, spanning and fixing the membrane with the membrane ring. The membrane ring was secured laterally with three holding clips. To culture cells, a compliant silicon containment ring was fused to the silicon membrane prior to assembly. Containment rings ($d_{out}$=16 mm, $d_{in}$=11 mm, h=5 mm, $A_{in}$=100 mm$^2$) were made from polydimethylsiloxane (PDMS, Sylgard®184, Dow Corning) using a 1:40 mixing ratio to produce soft rings with low mechanical resistance. Circular plastic molds were coated with 3,3,3-Trifluoropropyl-trichlorosilane (452807, Sigma) for 1 h under vacuum after which PDMS was poured into molds and cured overnight at 80° C. The contact areas between the silicone membranes and the silicone containment rings were ozone-activated for 60 s via corona arc-discharge (BD-20, Electro- Technic Products Inc.) after which rings were pressed onto the membranes, weighted down with a 100 g weigh to maintain close contact and incubated again overnight at 80° C. to facilitate bonding. Bonded membranes were sterilized with 70% Ethanol, dried, and stretch chambers were assembled.

Device Control: To operate the stretch device, a simple control circuit was designed in which an Arduino microcontroller (DEV-13975, SparkFun Electronics) modulated the magnitude and direction of a constant 6 A current from a DC power source (9129B, BK Precision) to the coil via a H-bridge (RB-Cyt-132, RobotShop). Two signals from the Arduino to the H-bridge controlled the current flow: A PWM pin (power-wave-modulation) sending low voltage from 0-5 V controlled the current intensity (FIG. 8a) and a digital pin (either 0 or 1) controlled the direction of the current to allow lifting of the piston in the relaxed state or attracting the piston downwards to intendent the engaged membrane. Arduino inputs were controlled via MATLAB (Mathworks, v. 2018b) via a USB interface and the Arduino Support from MATLAB package and a custom written code was used to operate the device.

Device Calibration: To measure piston movement and associated membrane indentation in response to electromagnetic fields, a laser distance sensor (Keyence LJ-G5001P) was pointed vertically at the top of the piston and changes in vertical movement were recorded via the Keyence LJ—Navigator software (Keyence, v. 1.7.0.0). Traction force microscopy[32] was used to determine the amount of strain applied to the membrane in response to electromagnetic fields. For strain measurements, containment wells were coated with 2 μm blue fluorescent beads (F8824, Life Technologies) and images were recorded before and after membrane indentation on an inverted epi-fluorescence microscope (Ti-Eclipse, Nikon) with a 60× water immersion objective (0.26 μm/pix) and an EMCCD camera (iXonEM+, Andor). Bead displacements were determined via the Particle Image Velocimetry (PIV) plugin on ImageJ (NIH, v. 1.50e) and strains were calculated from bead displacements using a custom written MATLAB code (Mathworks, v. 2018b). To determine to baseline Arduino input voltage to keep the piston floating over the deformation ring against its own weight, the piston was placed in a position in which the membrane would not touch the deformation ring and membrane strains during stepwise reduction of the magnetic field were determined. The baseline Arduino input voltage was determined as the input before distinct changes in membrane strain could be observed (FIG. 8b).

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1A:
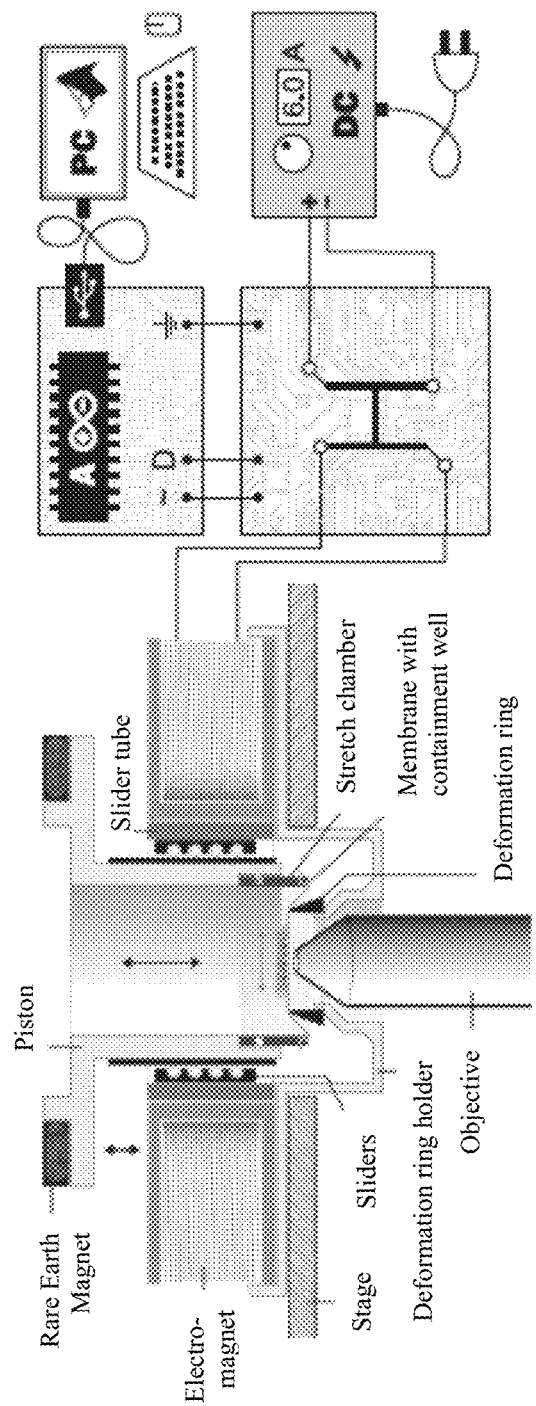
FIG. 1A is a cross-sectional illustration of an exemplary stretch device and its control circuit. The device, referred to as a "TENSCell device", allows for precise and repeatable membrane stretch via electromagnetic force. A suspended piston containing a permanent magnet moves vertically through an electromagnetic coil. Downward motion of the piston stretches a silicon membrane over a deformation ring, which holds the stretched membrane at a constant distance over a microscope objective. To control the electromagnet, an H-bridge is used to modulate intensity and direction of a constant current (6 A) from a DC power source through low voltage signals using an Arduino microprocessor. On the Arduino, a power-wave-modulation pin (~, 0-5 V) is used to control the intensity, and a digital pin (D, 0 or 1) is used to control the direction of the current. A USB interface enables control of the Arduino inputs via MATLAB.

The present invention provides a low-cost TENSCell (tension in cells) device that uses an electromagnetic piston to apply equiaxial stretch to a thin silicone membrane suspended over a water immersion objective (FIG. 1). An electromagnetic force is used to drive the membrane deformation because it can be precisely controlled without requiring special components; in an exemplary embodiment employing only an electromagnetic coil made in-house and a permanent rare earth magnet attached to the piston. Most device parts were three-dimensionally printed, making the system easy to replicate at a low cost. Only one part, a tapered circular ring that interfaces with the silicone membrane, was machined because of low-friction material requirements. The remaining parts (rare earth magnet, linear rails with carriages, and electronics for control) were generally inexpensive and readily available (Table 1). Using the TENSCell device, the dynamic response of nuclei from mouse embryonic skin fibroblasts when exposed to cyclic stretch was investigated. Experiments verified that nuclei respond rapidly (within minutes) to mechanical stimulation. Opposing nuclear responses were observed during low (5%) or high (20%) strain regiments, as well as nuclear area shrinkage and chromatin condensation in response to high strain, but nuclear area expansion and chromatin decompaction in response to low strain. The results further suggest that this dichotomous behavior might be mediated through different pathways because only responses to low cyclic strain were dependent on calcium signaling, whereas the actin skeleton was necessary for responses to both low and high strains. Further investigation of actin dynamics during cyclic stretch revealed a similar divergent behavior, with actin filaments shifting toward the nuclear periphery during high loads and toward the cell border during low loads. Actin depolymerization leads to an increase in nuclear strain transfer and DNA damage, overall suggesting that F-actin-dependent nuclear shrinkage might serve as a protective mechanism during high strain exposure.

Mechanical cues from the environment influence cell fate and behavior. Mechanisms of cellular mechanosensation are unclear, partially due to a lack of methods that can reveal dynamic processes. Herein, a new concept for a low-cost, magnetically-driven device that enables visualization and quantification of dynamic changes in cell behavior during mechanical stretch is presented. Using this device, it was observed that nuclei of mouse embryonic skin fibroblasts underwent rapid but divergent responses to strain magnitude, showing nuclear area increase and chromatin decompaction during 5% (low) strain, but nuclear area decrease and chromatin condensation during 20% (high) strain. Only responses to low strain were dependent on calcium, while actin inhibition abrogated any nuclear response and increased stretch-induced DNA damage. Stretch-activation revealed a shift in actin filaments away from (low strain) or towards (high strain) the nuclear periphery. The findings suggest that different pathways control strain level-dependent cell behavior and that mechanical confinement of nuclei through actin may be a protective mechanism during high strain loads.

Mechanical cues from the environment are known to have a profound impact on cell fate and cell behavior, a phenomena referred to as mechanosensation. Changes in mechanical properties due to trauma, chronic conditions, or genetic predispositions lead to cellular degeneration and result in a range of pathologies. Understanding the mechanisms involved in mechanosensation would allow researchers to direct cell differentiation and behavior to generate artificial tissues for drug testing or organ repair.

The nucleus is thought to be an essential mechanosensitive organelle as it is tightly connected to all parts of the cytoskeleton through LINC (Linker of Nucleo- and Cytoskeleton) complexes. Cyclic stretch has been shown to change nuclear morphology, induce chromatin condensation, increase mechanical resistance of nuclei and alter gene expression. Studies on isolated nuclei have demonstrated that the nucleus alone can respond to stretch, however, only when engaged via LINC complexes. Disruption of LINC complexes have shown to inhibit stretch-induced changes in chromatin remodeling and gene expression, suggesting that strain transfer from the cytoskeleton plays an important role for nuclear mechanosensation. The actin skeleton, in particular, has been shown to be crucial for nuclear responses to dynamic mechanical stimulation. Despite these findings, the underlying mechanisms of cellular and nuclear mechanosensation pathways are unclear, partially due to a lack of suitable methods to image cell behavior under mechanical stimulation in real time.

Figure 1B:
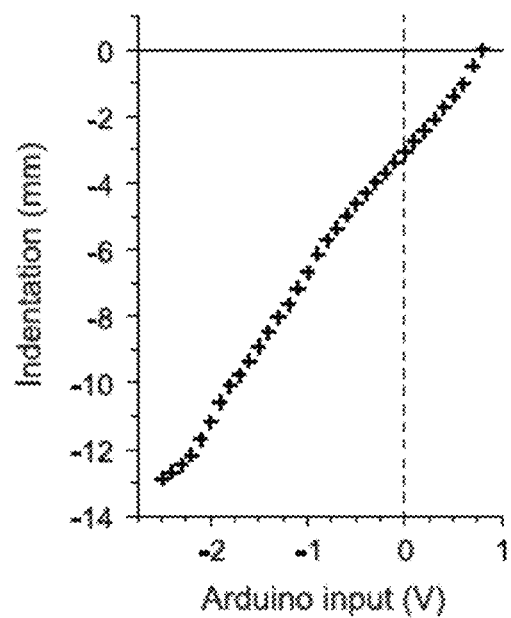
FIG. 1B is a graph showing the results of a distance measurement laser that was used to investigate piston movement, and thereby membrane indentation, in response to electromagnetic force as represented by Arduino input voltages. Electromagnetic force could be used for the precise membrane stretch.
Figure 1C:
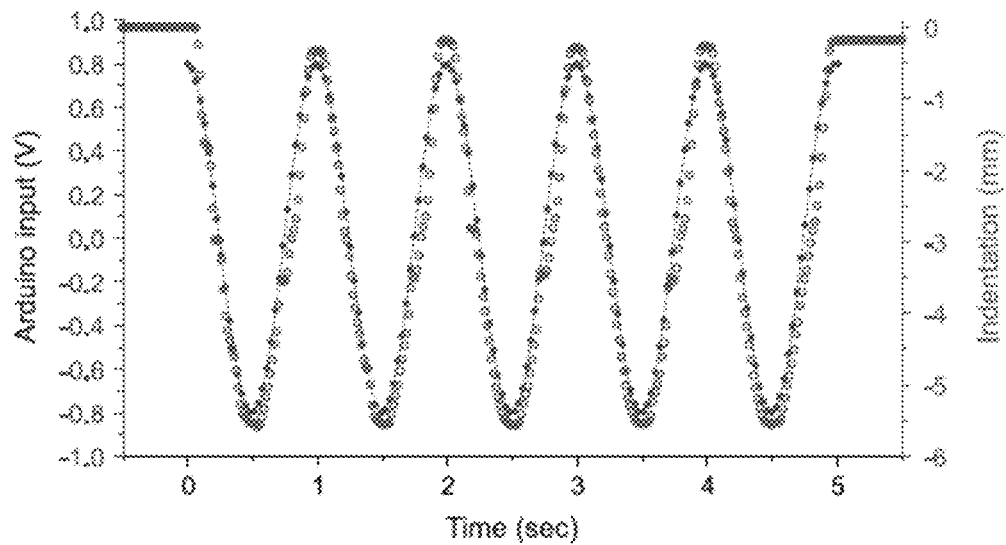
FIG. 1C is a graph showing the results of a sinusoidal function that was programmed in MATLAB to generate Arduino inputs from +0.8 to −0.8 V at a frequency of 1 Hz, and piston indentation was recorded over five cycles. Electromagnetic force could be used for precise and repeatable membrane indentation.
Figure 7:
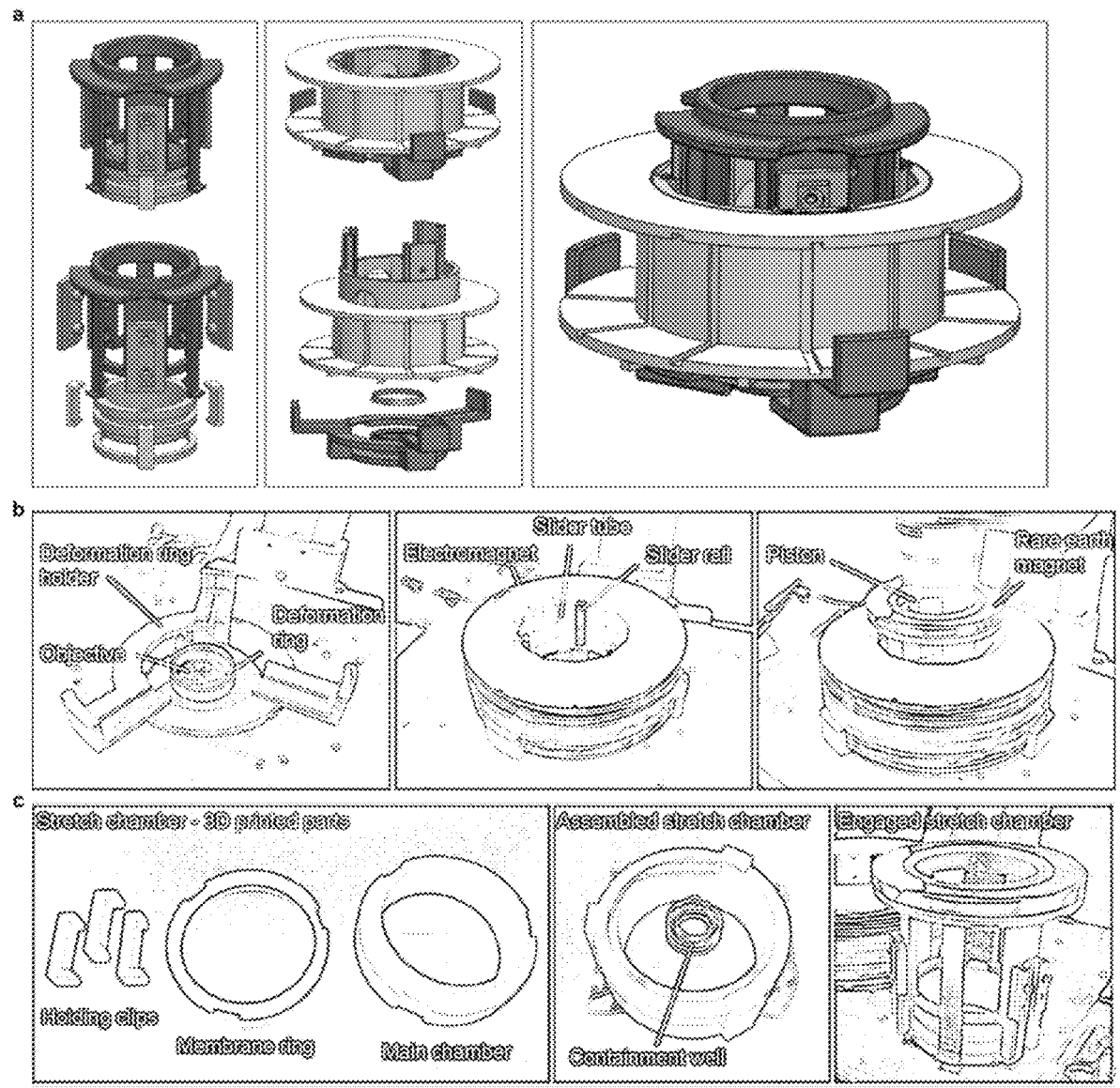
FIG. 7 is a set of drawings showing (a) CAD sketches and (b and c) real images of components and assembly. (a) SolidWorks CAD drawings of the 3D printed stretch device components shown assembled or as blow-up. Drawings also show slider rails and carriages (in gray). (b) The deformation ring holder is fixed into the manual stage of a Nikon Eclipse Ti Microscope by interlocking with two metal wings in the circular notch that otherwise holds an aluminum tray. The slider tube pushed tightly into the inner hole of the electromagnetic coil. Together, the slider tube and electromagnetic coil are placed on top of the deformation ring holder. The piston attached to a rare earth magnet is then placed into the slider tube via the friction-reduced slider interface. (c) The stretch chamber consisted of three parts which after assembly would fix a thin silicone membrane in place. A compliant silicon containment ring was fused to the silicon membrane prior to assembly to culture cells. The assembled stretch chamber can then be engaged into the piston and is held securely in place through bendable side pins that lock into the side grooves of the main chamber.

Provided herein is a low-cost device that uses electromagnetic force to apply a precise equiaxial stretch to a thin silicone membrane suspended over a water-immersion objective (FIGS. 1A and 7). Using electromagnetic force is an advantage because it can be precisely controlled without requiring special components; in this case only needing an electromagnetic coil made in-house and a permanent rare earth magnet. Most of the device parts were 3D printed making the system easy to replicate at a low cost. Only one part, a tapered circular ring that interfaces with the silicone membrane, was machined due to low-friction requirements. The remaining parts (rare earth magnet, linear rails with carriages and electronics for control) were generally inexpensive and readily available (Table 1). Using the device taught herein, we investigated the dynamic response of nuclei from mouse embryonic skin fibroblasts when exposed to cyclic stretch was investigated. The experiments verified that nuclei respond rapidly to mechanical stimulation. Interestingly, we observed contrasting behavior for cells during low or high strain regiments, as we observed nuclear area shrinkage and chromatin condensation in response to high strain, but nuclear area expansion and chromatin decompaction in response to low strain. This dichotomous behavior appeared to be mediated through different pathways as only responses to low strain cyclic stretch were dependent on calcium signaling while the actin skeleton was necessary for any strain response. Imaging of actin dynamics during cyclic stretch revealed a divergent behavior similar to that of nuclei with actin filaments shifting from the cell border to towards the nuclear periphery during high strain loads and vice versa for low strain. Moreover, actin depolymerization lead to an increase in DNA damage with increasing levels of strain, suggesting that F-actin-dependent nuclear shrinkage might serve as a protective mechanism during high strain loads.

Example 1—Cell Stretch Device—Fabrication

A cell stretch device was designed to acquire high-magnification images of cells during the application of equiaxial strain while also avoiding the use of expensive materials or complex designs. Two types of three-dimensional (3D) printers were used to fabricate a majority of the components: Objet30 (Computer Aided Technology, Buffalo Grove, Ill.), using the material VeroClear (OBJ-04055; Computer Aided Technology), and the uPrint SE Plus (311-20200; Computer Aided Technology), using ABS+. Designs for the device components were created as CAD files using SolidWorks (v. 2018; Dassault Systèmes SolidWorks). All parts were printed at the Integrated Teaching and Learning Laboratory at the University of Colorado Boulder.

The main body consisted of four parts: a deformation ring holder, an electromagnet case, a slider tube, and a piston (FIG. 1), which were printed using the uPrint SE Plus. The deformation ring holder was designed to fit into the circular notch of the manual stage of a Nikon Eclipse Ti microscope (Nikon, Tokyo, Japan) by interlocking with two metal wings that otherwise hold the aluminum sample tray and contained an adaptor that encased the microscope objective and held the deformation ring. Within the encasement, the objective had a moving range of −8 mm in each direction. The deformation ring was machined from Delrin Acetal Resin (8572K27; McMaster-Carr, Elmhurst, Ill.) to provide a friction-reduced interface with the silicone membrane. The deformation ring facilitates the stretch of the membrane as the membrane is pushed against the deformation ring. The slider tube fit tightly into the electromagnetic coil and contained three slider rails (NS-01-27; Igus, Cologne, Germany) for friction-reduced vertical movement of the piston, which in turn contained three matching slider carriages (NW-02-27; Igus). A rare earth magnet (R3525; SuperMagnetMan, Birmingham, Ala.) was attached to the top of the piston to transmit force from the electromagnet below.

The stretch chamber consisted of three parts: a main chamber, a membrane ring, and holding clips, which were printed using the Objet30. The stretch chamber was assembled by placing a 60×60 mm silicon elastomer membrane (gloss 0.005; Specialty Manufacturing, St. Paul, Minn.) straight onto the elevated inner edge of the main chamber, spanning and fixing the membrane with the membrane ring. The membrane ring was secured laterally with three holding clips. To culture cells, a compliant silicon containment ring was fused to the silicon membrane before assembly. The containment ring allows for culture media fluid to be added and localized to the cells (e.g. to sustain their activity during long term experiments). Containment rings ($d_{out}$=16 mm, $d_{in}$=11 mm, h=5 mm, $A_{in}$=100 mm$^2$) were made from polydimethylsiloxane (Sylgard184; Dow Corning, Midland, Mich.) using a 1:40 mixing ratio to produce soft rings with low mechanical resistance. Circular plastic molds were coated with 3,3,3-trifluoropropyl-trichlorosilane (452807; Sigma-Aldrich, St. Louis, Mo.) for 1 h under vacuum, after which polydimethylsiloxane was poured into molds and cured over night at 80° C. The contact areas between the silicone membranes and the silicone containment rings were ozone activated for 60 s via corona arc discharge (BD-20; Electro-Technic Products, Chicago, Ill.), after which rings were pressed onto the membranes, weighted down with a 100 g weight to maintain close contact, and incubated again overnight at 80° C. to facilitate bonding. Bonded membranes were sterilized with 70% ethanol and dried, and stretch chambers were assembled.

Example 2—Cell Stretch Device—Control

Figure 8:
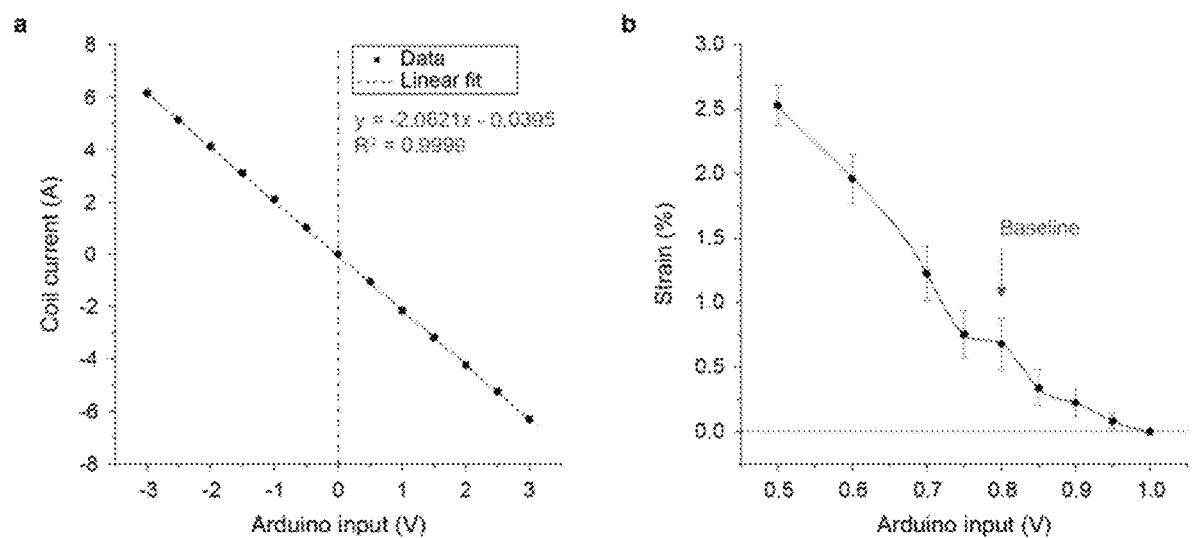
FIG. 8 is a pair of graphs showing current control via Arduino input voltages and determination of baseline Arduino input voltage. (a) Correspondence of Arduino input voltages to the amount of current received by the electromagnet coil was measured using a multimeter. (b) The baseline Arduino input voltage is the input at which the membrane contacts the deformation ring without indention. Membrane containment wells were coated with 2 μm sized fluorescent beads and membrane strains were calculated using traction force microscopy. To determine the baseline, the membrane was suspended above the deformation ring and the Arduino input voltage was stepwise lowered (+1.0 to +0.5 V) while measuring the strain applied to the membrane via bead displacements. The baseline Arduino input voltage was determined to be +0.8 V as the input before distinct increases in membrane strain could be measured.

To operate the stretch device, a simple control circuit was designed in which an Arduino microcontroller (DEV-13975; SparkFun Electronics, Niwot, Colo.) modulated the magnitude and direction of a constant 6 A current from a DC power source (9129B; BK Precision, Yorba Linda, Calif.) to the coil via an H-bridge (RB-Cyt-132; RobotShop, Mirabel, Quebec, Canada). Two signals from the Arduino to the H-bridge controlled the current flow: A power-wave-modulation pin sending low voltage from 0 to 5 V controlled the current intensity (FIG. 8), and a digital pin (either 0 or 1) controlled the direction of the current to allow lifting of the piston in the relaxed state or attracting the piston downwards to intendent the engaged membrane. Arduino inputs were controlled via MATLAB (v. 2018b; The MathWorks, Natick, Mass.) via a USB interface and the Arduino Support from MATLAB package, and a custom-written code was used to operate the device.

Example 3—Cell Stretch Device—Calibration

Figure 12:
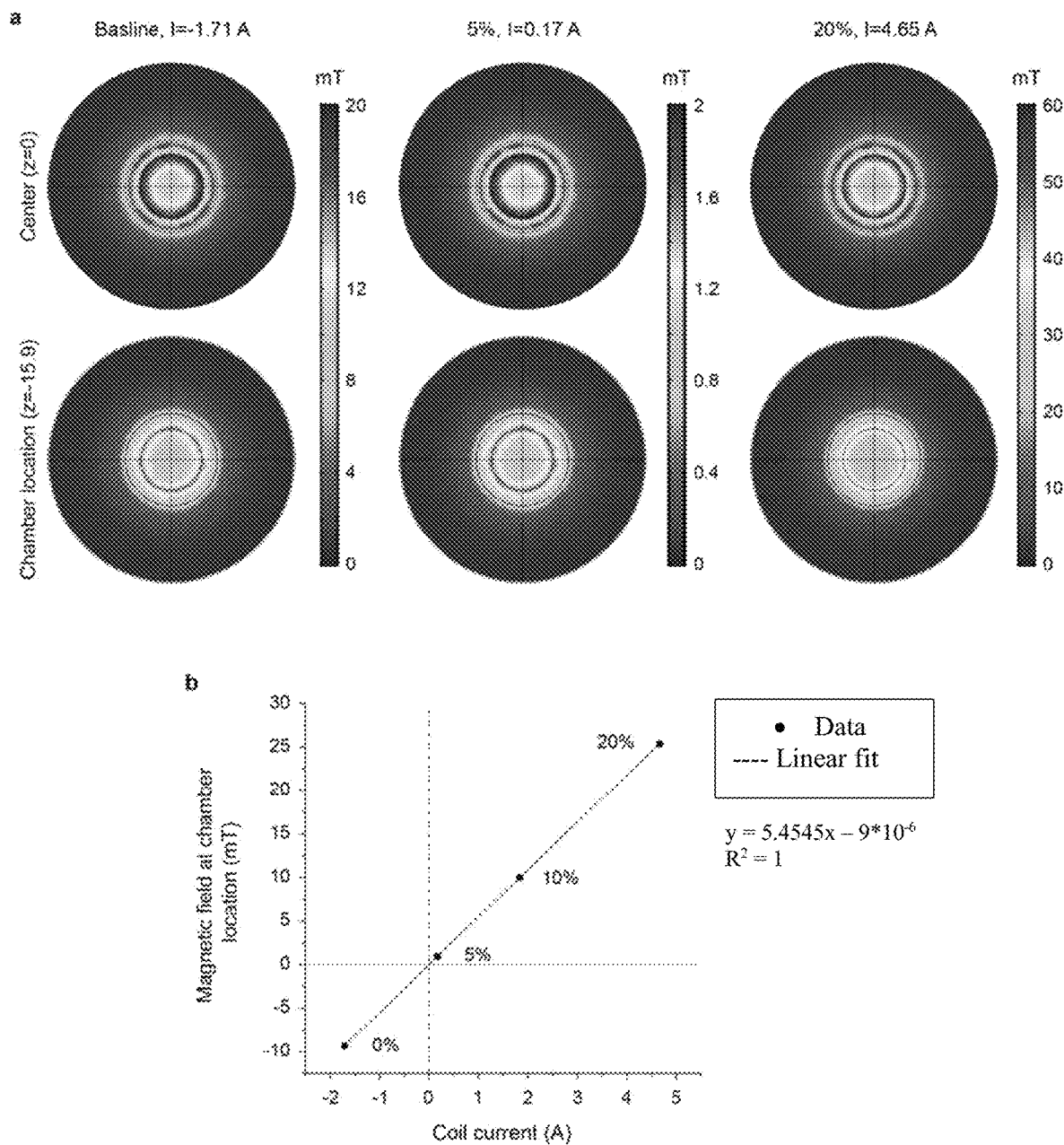
FIG. 12 is a set of images (a) and a graph (b) showing COMSOL-modeling of electromagnetic fields. (a) Top view of magnetic fields produced by the electromagnetic coil during peak strains corresponding to 5% or 20% strain routines, or during rest (baseline). Two different z-planes are presented: at the center of the coil (z=0 mm) and at the location of the membrane close to the bottom of the coil (z=15.9 mm). Amount of current used to produce magnetic fields are indicated at the top. (b) Magnetic fields at chamber location (z=15.9 mm) for different currents applied to the electromagnetic coil. Corresponding levels of membrane strain are as indicated.

To measure piston movement and associated membrane indentation in response to electromagnetic fields, a laser distance sensor (LJ-G5001P; Keyence, Osaka, Japan) was pointed vertically at the top of the piston, and changes in vertical movement were recorded via the Keyence LJ-Navigator software (v. 1.7.0.0; Keyence). Particle tracking (L. Martiel, A. Leal, et al., M. ThéryMeasurement of cell traction forces with ImageJMethods Cell Biol, 125 (2015), pp. 269-287) was used to determine the amount of strain applied to the membrane in response to electromagnetic fields. For strain measurements, containment wells were coated with 2 µm blue fluorescent beads (F8824; Life Technologies, Carlsbad, Calif.), and images were recorded before and after membrane indentation on an inverted epi-fluorescence microscope (Ti-Eclipse; Nikon) with a 60× water immersion objective (0.26 µm/pixel) and an EMCCD camera (iXonEM+; Andor Technology, South Windsor, Conn.). Bead displacements were determined via the particle image velocimetry plugin on ImageJ (v. 1.50e; National Institutes of Health (NIH), Bethesda, Md.), and hydrostatic strain was calculated from bead displacements (S. Ghosh, B. Seelbinder, et al., eformation microscopy for dynamic intracellular and intranuclear mapping of mechanics with high spatiotemporal resolution Cell Rep, 27 (2019), pp. 1607-1620.e4) using a custom-written MATLAB code (v. 2018b; The MathWorks). To determine the offset, the Arduino input voltage that kept the piston suspended over the deformation ring against its own weight, the piston was placed in a position in which the membrane would not touch the deformation ring and membrane strains were determined during stepwise reduction of the magnetic field. The offset Arduino input voltage was determined as the input before distinct changes in membrane strain could be observed (FIG. 8b). Electromagnetic fields produced by the coil (FIG. 12) were modeled using COMSOL (v. 5.2.0.166).

To record the dynamic responses of single cells at high magnification during mechanical stimulation, a system in which a thin (~127 µm) silicone membrane is stretched over a microscope objective using an electromagnetic piston was fabricated (FIG. 1A and FIG. 7a). A static deformation ring around the objective allowed for a stable imaging plane in the x, y, and z directions. The silicone membrane was assembled into a stretch chamber (FIG. 7b) and fused to a compliant silicone ring to form a containment well, e.g., to culture cells, wherein chemically-defined culture media is allowed to be added and contained in the region of cell localization. Within a defined time period (e.g., minutes to hours), the cells become adherent to the membrane, and membrane stretch is allowed to transfer to and directly cause the cells to stretch. The stretch chamber, in turn, could be engaged into a piston that could move freely up and down in an electromagnetic coil via sliders. The piston contained a rare earth magnet at the top to transfer force from the electromagnet below. When current was applied to the coil, the resulting electromagnetic field lifted the piston up or pushed it down depending on the orientation of the magnetic field. The electromagnetic field, in turn, was controlled through an Arduino microprocessor that modulated intensity and the direction of current from a constant DC power source (FIG. 8a). A laser displacement sensor was used to show that the electromagnetic field could be used to precisely (FIG. 1B) and repeatedly (FIG. 1C) control the position of the piston and, therefore, the indentation of the membrane.

Figure 2A:
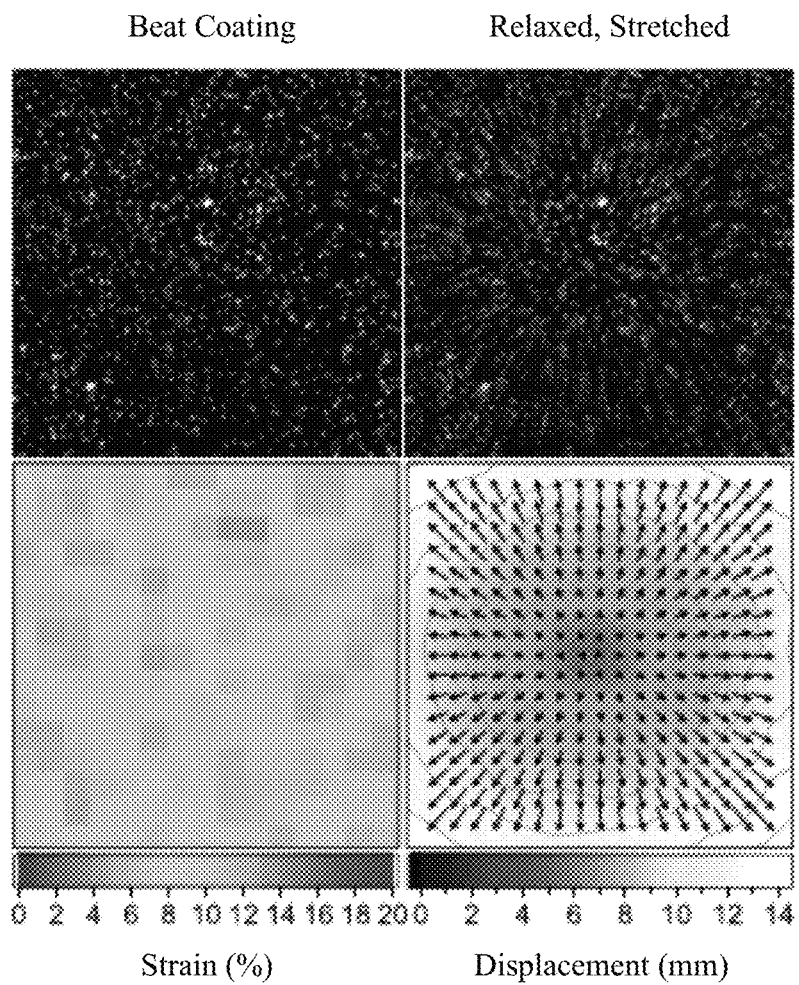
FIG. 2A is a set of images showing an example of recorded bead displacements and the resulting strain map for an Arduino input of −0.9 V. The set of FIGS. 2A-2D show TENSCell device calibration and performance using particle tracking. Membrane containment wells were coated with 2-μm-sized fluorescent beads, and membrane strains at different Arduino input voltages were determined from bead displacements. The start point of the calibration was the offset Arduino input voltage (+0.8 V) at which the membrane rests on the deformation ring without stretch.
Figure 2B:
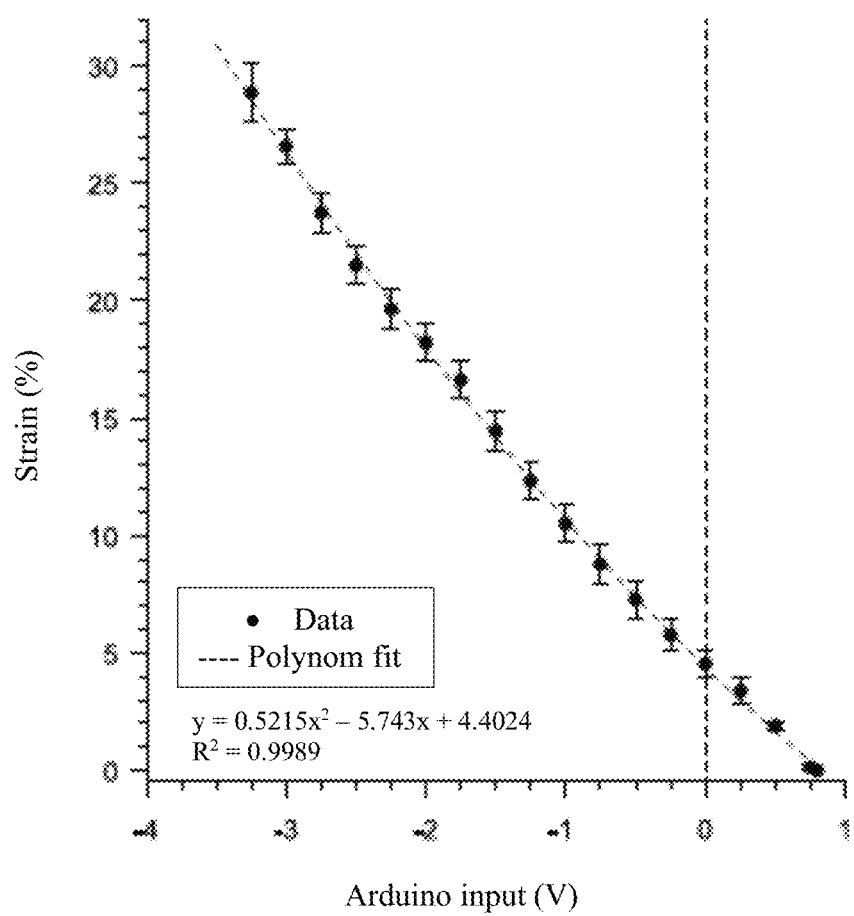
FIG. 2B is a graph showing a calibration curve as determined through bead displacements. The acquired data fit a second-order polynomial function; SD; n=3.
Figure 2C:
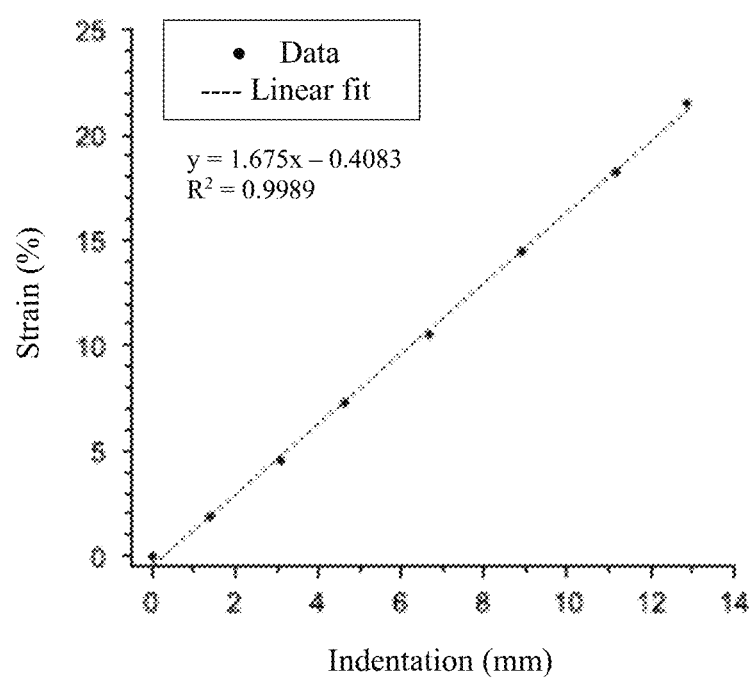
FIG. 2C is a graph showing plotting calculated membrane strains over measured membrane indentations from FIG. 1B, which showed a linear relationship.
Figure 2D:
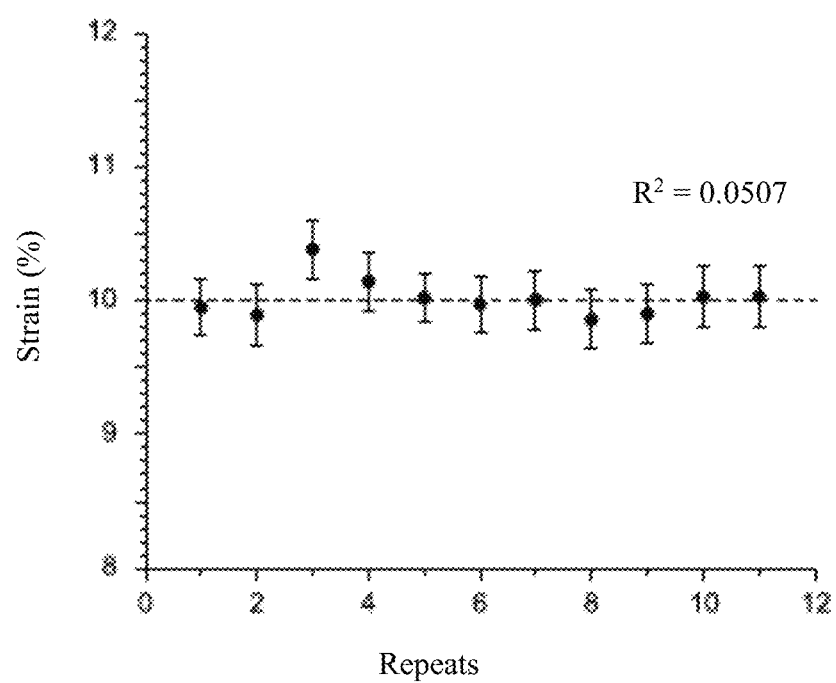
FIG. 2D is a graph showing measurements of consecutive membrane indentation for an Arduino input of −0.9 V showed repeatable application of strain within 0.5%.

To calibrate the TENSCell device, membranes were coated with fluorescent beads. During membrane stretch, bead displacements were recorded on a microscope to calculate the resulting strain using traction force microscopy (FIG. 2A). Because the piston has a weight that would stretch the membrane in the absence of a magnetic field, the Arduino input voltage that produced an electromagnetic field to keep the piston suspended without membrane indentation (offset) was determined to be +0.8 V (FIG. 8b). For calibration, bead displacements were recorded in response to different Arduino inputs from +0.8 to −3.25 V. The resulting current versus strain calibration curve fit best to a third-order polynomial function because of a mild inflection around 0 V; however, a second-order polynomial function fit almost equally well and was chosen for simplicity (FIG. 2B). Based on the SD observed, the minimum strain that could be applied reliably is −0.5%. The maximum strain that can be applied is dependent on the device properties, more specifically strength of the magnetic field and indentation depth of the deformation ring holder. The maximum strain of the device used in this study is around 29%. Plotting of membrane indentation versus strain from associated Arduino inputs showed a linear relationship, as would be expected from a linear elastic material such as silicone (FIG. 2C). Analysis of repeated membrane stretch from +0.8 to −0.9 V, corresponding to 10% strain, showed reliable strain application within 0.5% with no indication of declining or increasing trends within 11 repeats (FIG. 2D). The material properties of silicone elastomers have been well tested, and previous studies have shown that they can be reliably loaded for $10^2$-$10^3$ cycles (C. P. Neu, M. L. Hull, J. H. Walton Error optimization of a three-dimensional magnetic resonance imaging tagging-based cartilage deformation technique. Magn. Reson. Med, 54 (2005), pp. 1290-1294). Next, we performed live-cell imaging of cells during cyclic stretch routines was performed to validate the utility of the device.

Example 4—Mouse Embryonic Skin Fibroblast Isolation, Culture, and Pharmacological Treatments Transgenic mice harboring a fluorescence tag at the H2b histone—B6.Cg-Tg (HIST1H2BB/EGFP) 1 Pa/J, Stock No: 006069—were obtained from Jackson Laboratory (Bar Harbor, Me.). All animal procedures were performed following Institutional Animal Care & Use Committee approval. Skin from embryonic mice was harvested 18.5 days post-conception. Skin was minced, washed with Hank's Balanced Salt Solution (HBSS), and incubated in 35 mm dishes in shallow medium (~0.5 mL) to avoid floating of the tissue for 4 days, during which fibroblasts extruded from the tissue. After 4 days, remaining tissue was removed (picked out with a pipette), and extruded cells in the dish were detached using TrypLE (Gibco, Gaithersburg, Md.) and expanded in culture for another 2 days before being seeded into stretch chambers for experiments. The inner well of assembled stretch chambers was ozone activated for 30 s via corona arc discharge (BD-20; Electro-Technic Products) and coated with 50 µg/mL bovine plasma fibronectin (F1141; Sigma-Aldrich) in a total volume of 250 µL overnight at 37° C. Mouse embryonic skin fibroblasts (MSFs) were seeded into stretch chambers at a density of 80,000 cells/cm' 1 day before experiments. MSFs were extruded and cultured in DMEM (ATCC, Manassas, Va.) containing 10% fetal bovine serum (Gibco), 1% penicillin-streptomycin (Gibco), and 25 mM HEPES (Gibco) at 37° C. and 5% $CO_2$. To inhibit calcium signaling, MSFs were incubated with 50 µM BAPTA (A4926; Sigma-Aldrich) or 10 µM KN-62 (12142; Sigma-Aldrich) 1 h before cyclic strain experiments. To disrupt actin polymerization, MSFs were incubated with 2 µM cytochalasin D (C8273; Sigma-Aldrich) 30 min before experiments. Vehicle controls were incubated with 0.001% DMSO (276855; Sigma-Aldrich) 1 h before experiments. To test the use of chromatin dyes, cells were stained with Hoechst (NucBlue Live ReadyProbes; Life Technologies) 30 min before experiments. Stretch experiments were performed at 25° C. (room temperature) under humidified conditions.

Example 5—Additional Materials and Methods

Live imaging and analysis of nuclear behavior during stretch routines:

The stretch device was mounted on an inverted epifluorescence microscope (Ti-Eclipse; Nikon) with a 60× water immersion objective (0.26 µm/pixel) and an EMCCD camera (iXonEM+; Andor Technology). The surrounding of the microscope was humidified to prevent the water on the objective from evaporating during the 1 h experiment. Oil immersion is also possible, but water immersion provided better image quality with the silicone membranes used.

Using MATLAB, a sinusoidal control signal (1 Hz) was sent to the Arduino controller, resulting in a cyclic stretch routine of the membrane (FIG. 1C), with peak strains set to 5% (−0.1 V), 10% (−0.9 V), and 20% (−2.25 V) as determined by the calibration curve. Cells were cyclically stretched for 30 min, followed by 30 min of rest, during which 2 µm z-stacks (0.5 µm steps) of nuclei were acquired. During the rest period, cells experienced no stretch but a constant magnetic field using the offset Arduino input voltage (0.8 V) that keeps the piston suspended at 0% stretch. For acquisition, the cyclic stretch routine was paused for 1 min to allow for a steady imaging plane and fine readjustments in z-position due to water evaporation. Unstretched control cells (0%) were seeded into stretch chambers but kept stationary on the microscope without any magnetic field applied. Unstretched magnetic control cells (MAG) were placed stationary inside the coil without the piston, and a magnetic field corresponding to a 20% sinusoidal stretch routine was applied.

A custom MATLAB code was used to track nuclear outlines via H2b-eGFP and to generate H2b intensity histograms during an image series, from which changes in nuclear area, H2b skewness, and H2b kurtosis were calculated.

To analyze the amount of strain transferred from the membrane to the nucleus after cyclic stretch routines, image stacks of nuclei were acquired under relaxed or stretched conditions, and bulk nuclear strain was calculated from the change in nuclear area using the same MATLAB script as above. Note that nuclear strain transfer could not be accurately analyzed before stretch routines because of the fast response in area decline.

Perinuclear F-actin and γH2a.x Staining and Analysis:

MSFs were fixed in 4% ice-cold paraformaldehyde (PFA) for 10 min, permeabilized with 1% Triton-X100 in phosphate-buffered saline for 15, min and blocked with 10% NGS, 1% bovine serum albumin in 0.1% PBT (0.1% Tween-20 in phosphate-buffered saline) for 60 min. Primary incubation of Phospho-Histone H2A.X Ser139 (9718S; Cell Signaling Technology, Danvers, Mass.) was performed at 4° C. overnight in 0.1% PBT containing 1% bovine serum albumin at 1:400. Secondary incubation of goat anti-rabbit IgG-AF546 (Life Technologies) was performed in primary incubation buffer for 45 min at 22° C. at a dilution of 1:500. F-actin was counterstained with phalloidin-CF405 (Biotium, Fremont, Calif.) for 30 min at a dilution of 1:30. Staining was performed in containment wells. After staining, membranes were cut out of the containment well using a circular punch and mounted cell-side up onto #1.0 glass slides with ProLong Diamond Antifade Mountant (Life Technologies). Image stacks (5 µm, 1 µm step) of multiple nuclei in a 318×318 µm area were acquired on a Nikon MR confocal microscope using a 40× oil immersion objective (0.31 µm/pixel). A custom MATLAB code was used to track nuclear outlines via H2b-eGFP and to quantify perinuclear F-actin intensities and γH2a.x foci in projected image stacks. Only the projected F-actin within the nuclear outline (apical perinuclear F-actin) was counted in this analysis. To account for variations in staining and imaging (the same imaging settings were used), fluorescence channels were histogram normalized. Perinuclear F-actin intensities were calculated as the sum of normalized phalloidin intensities within a nuclear border. DNA damage foci were determined by detecting 2D peaks in the normalized γH2a.x channel using the MATLAB script FastPeakFind (v. 1.7).

LifeAct Transfection and Analysis of Actin Dynamics:

MSFs were transfected with mRuby-Lifeact-7 using Lipofectamine 3000 (Life Technologies) 18 h after seeding into stretch chambers; mRuby-Lifeact-7 was a gift from Michael Davidson (#54560; Addgene, Cambridge, Mass.). 1 day after transfection, 2 µm image stacks (0.5 µm steps) of actin (Lifeact) and nuclei (H2b) were acquired during 30 min of cyclic stretch, followed by 30 min of rest (no stretch, static magnetic field using the offset Arduino input +0.8 V). Profile lines were generated with the Plot Profile function in ImageJ (v. 1.50e; NIH) using an eight pixel (=2.1 µm) thick line. Binned profile analysis was performed using a custom MATLAB code that tracked cell and nuclear outlines during an image series using the Lifeact or H2b fluorescence channel, respectively. Image stacks were rotated to align actin filaments in the horizontal direction, and projections of 8-pixel-thick vertical profile lines that crossed through the nuclear center were extracted for further analysis. During each time step, profile line positions were fixed with respect to the nuclear center. Using the position of the cell and nuclear boundary, profile lines were binned with five bins representing Lifeact intensities from the nuclear center to the inner nuclear border and another five bins representing intensities from the nuclear periphery to the cell border. Corresponding bins from each half of the cell were averaged.

Statistical Analysis:

One-way ANOVA with Tukey's honestly significant difference post hoc test or two-tailed t-test analysis was performed to evaluate statistical significance using JMP Pro12 software (SAS Institute, Cary, N.C.). Displayed error (SD, standard deviation; SEM, standard error of the mean), number of individual data points (n), and number of independent experiments (exp., if different from n), as well as significances and statistical tests that were used, are indicated in the figure captions.

Figure 3A:
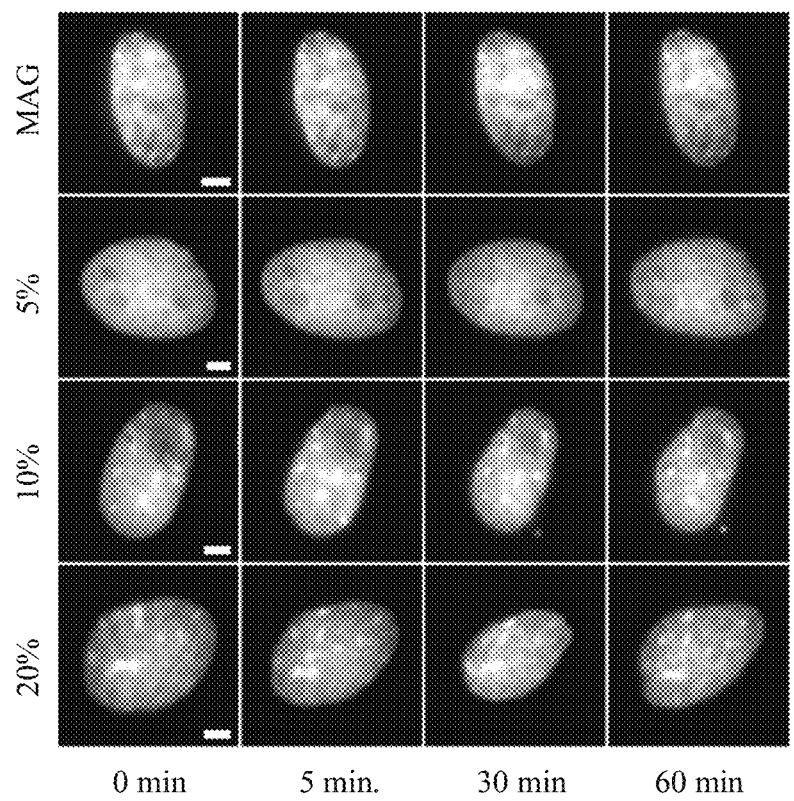
FIG. 3A is a set of images of nuclei recorded via H2b-eGFP; scale bars, 5 μm. MSF nuclei show opposing changes in nuclear area and chromatin condensation during low-strain and high-strain cyclic stretch. MSFs were exposed to 30 min of sinusoidal stretch with peak strains of 0, 5, 10, or 20%, followed by 30 min of no stimulation (rest), during which image stacks of nuclei were recorded. Control cells were exposed to the magnetic field alone without stretch (MAG).
Figure 3B:
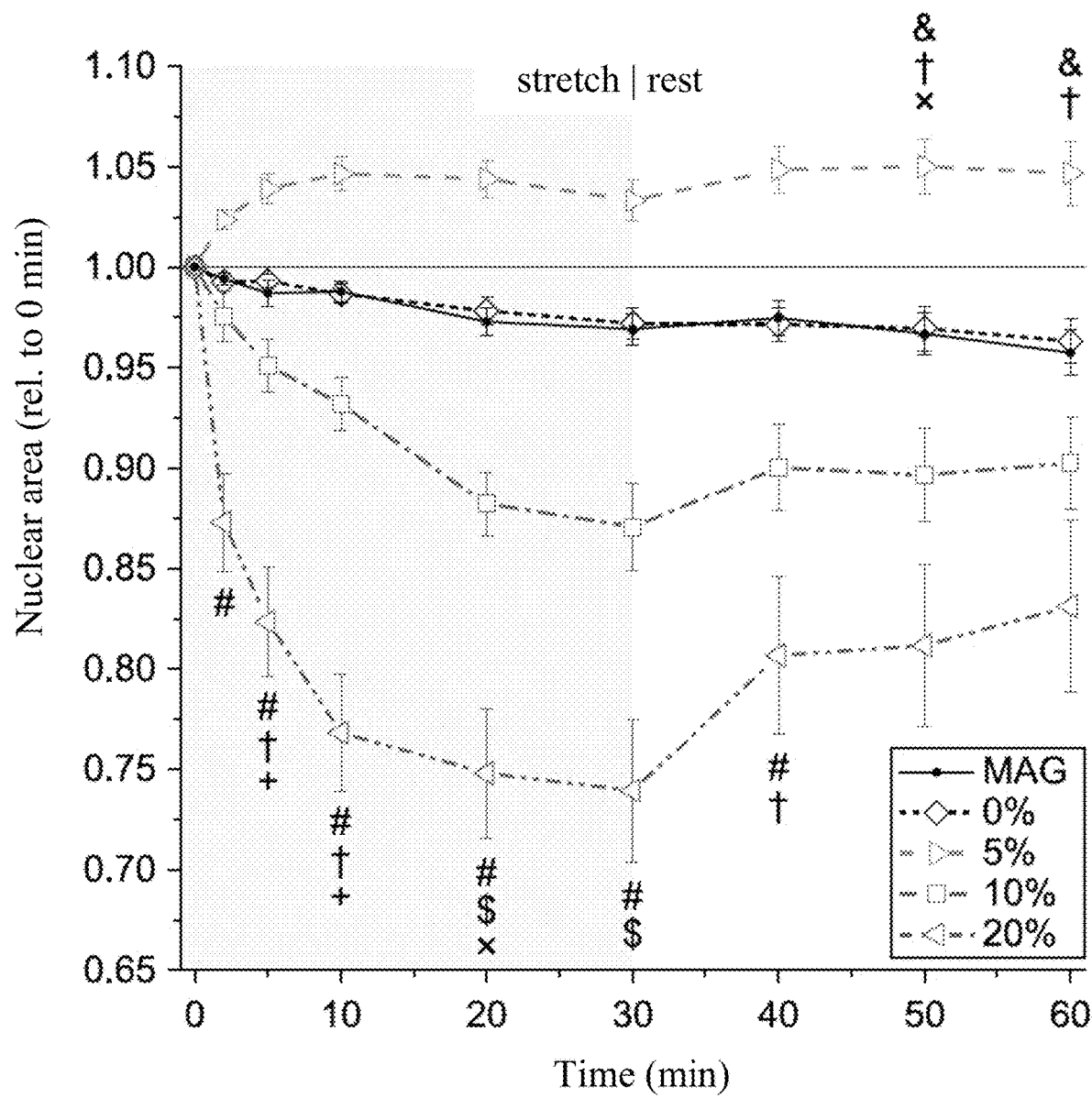
FIG. 3B is a graph showing the relative changes in nuclear area (relative to 0 min) during stretch routines. Nuclear areas decreased in response to high strains (10, 20%), but increased for low strain (5%), whereas exposure to the magnetic field alone (MAG) showed no difference compared to unstretched cells (0%).

Example 6—Nuclei of MSF Show Dichotomous Responses to Low and High Strain Levels To test the device, the dynamic behavior of cell nuclei from MSFs from H2b-eGFP harboring mice in response to equiaxial stretch was investigated. MSFs were seeded onto fibronectin-coated stretch chambers and stimulated with a sinusoidal stretch routine (1 Hz) for 30 min with peak strains of 5, 10, or 20%. The stretch routine was followed by 30 min of no stimulation (rest) to determine reversibility of any observed responses. In addition to unstretched controls (0%), cells were also subjected to a magnetic field that corresponded to a 20% stretch routine (MAG) under static conditions (no stretch) to assess effects of the magnetic field alone. Image stacks of nuclei were acquired via H2b-eGFP (FIG. 3A). Unstretched control cells (0%) showed a continuous but slight decline in nuclear area during the 1 h experiment (FIG. 3B). This was likely a result of cell toxicity because of light radiation during imaging and performing experiments at room temperature (See Example 4). In contrast, the areas of nuclei decreased rapidly in response to high strains of 20%, continued decreasing during the 30 min of stretch, and increased again during the 30 min rest period. Rapid here is defined as observing an immediate and significant change based on the time resolution (approximately minutes) of our experiment. Nuclei subjected to 10% cyclic strain also showed a decrease in area, but to a lesser extent and more delayed compared with the 20% strain routine. At 5% strain, nuclear areas increased during stretch and stayed elevated during rest.

Figure 3C:
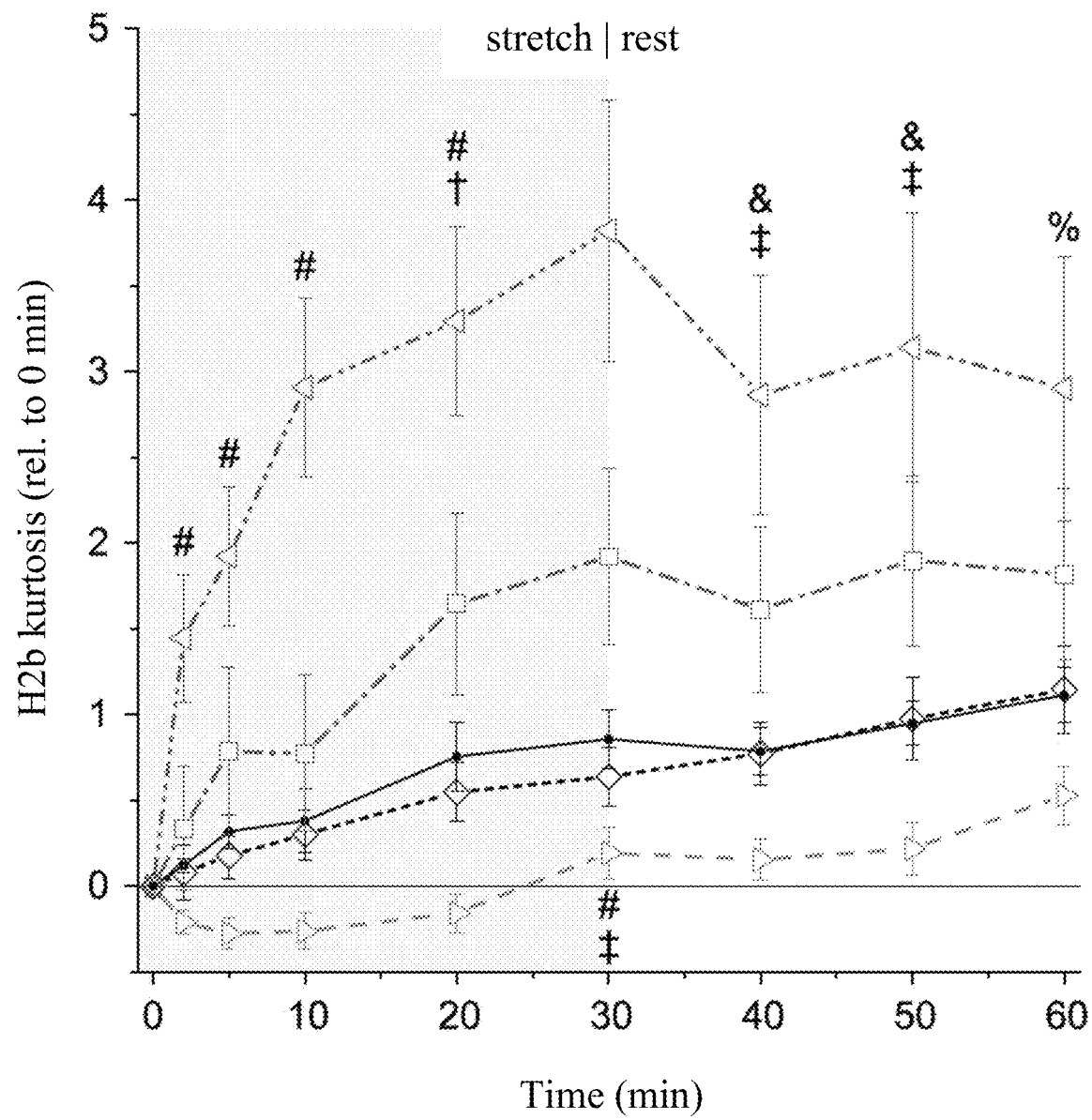
FIG. 3C is a graph showing the relative difference in H2b histogram kurtosis (compared with 0 min) during stretch routines. Kurtosis and skewness increased under high-strain routines (10, 20%), whereas they decreased for low strain (5%), indicating elevated or subsided chromatin condensation, respectively; SEM; n>24 from four exp.; ANOVA: #$p<0.01$ for 20% vs. all, $$p<0.01$ for 10% vs. all, †$p<0.01$ or ‡$p<0.05$ for 5% vs. 10%, &$p<0.01$ or %$p<0.05$ for 20% vs. MAG, 0 and 5%, +$p<0.05$ for 5% vs. MAG, ×$0.05$ for 5% vs. MAG and 0%.
Figure 3D:
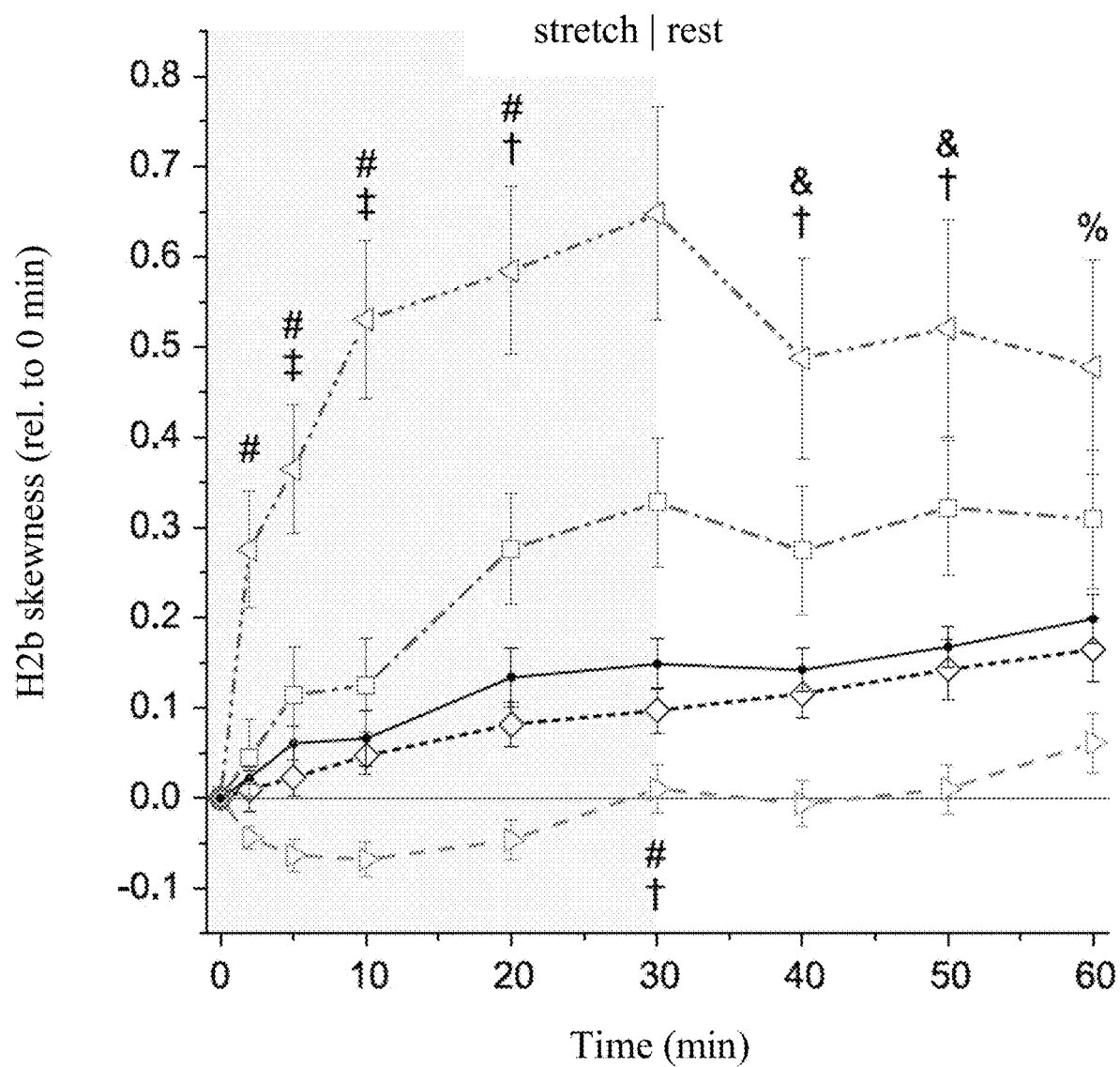
FIG. 3D is a graph showing the relative difference in H2b histogram skewness (compared with 0 min) during stretch routines. Kurtosis and skewness increased under high-strain routines (10, 20%), whereas they decreased for low strain (5%), indicating elevated or subsided chromatin condensation, respectively; SEM; n>24 from four exp.; ANOVA: #$p<0.01$ for 20% vs. all, $$p<0.01$ for 10% vs. all, †$p<0.01$ or ‡p<0.05 for 5% vs. 10%, &p<0.01 or %0.05 for 20% vs. MAG, 0 and 5%, +p<0.05 for 5% vs. MAG, ×p<0.05 for 5% vs. MAG and 0%.

Changes in chromatin organization were further analyzed by measuring the skewness and kurtosis of chromatin intensity histograms, with a shift toward higher intensities (positive skewness) and narrowing of the histogram peak (positive kurtosis) indicating elevated chromatin compaction. Similar to nuclear area, MSF nuclei subjected to 20% cyclic strain showed a rapid (<2 min) increase in both skewness and kurtosis during the stretch interval, followed by a mild decline during the rest period. Nuclei subjected to 5% cyclic strain showed a decrease in skewness and kurtosis during the stretch and rest period (FIG. 3C). Changes in nuclear area, as well as H2b histogram skewness and kurtosis of MSFs subjected to the magnetic field alone (MAG), closely matched that of unstretched control cells (0%) in absence of a magnetic field, suggesting that the magnetic field had no influence on the observed cell behavior.

Figure 9:
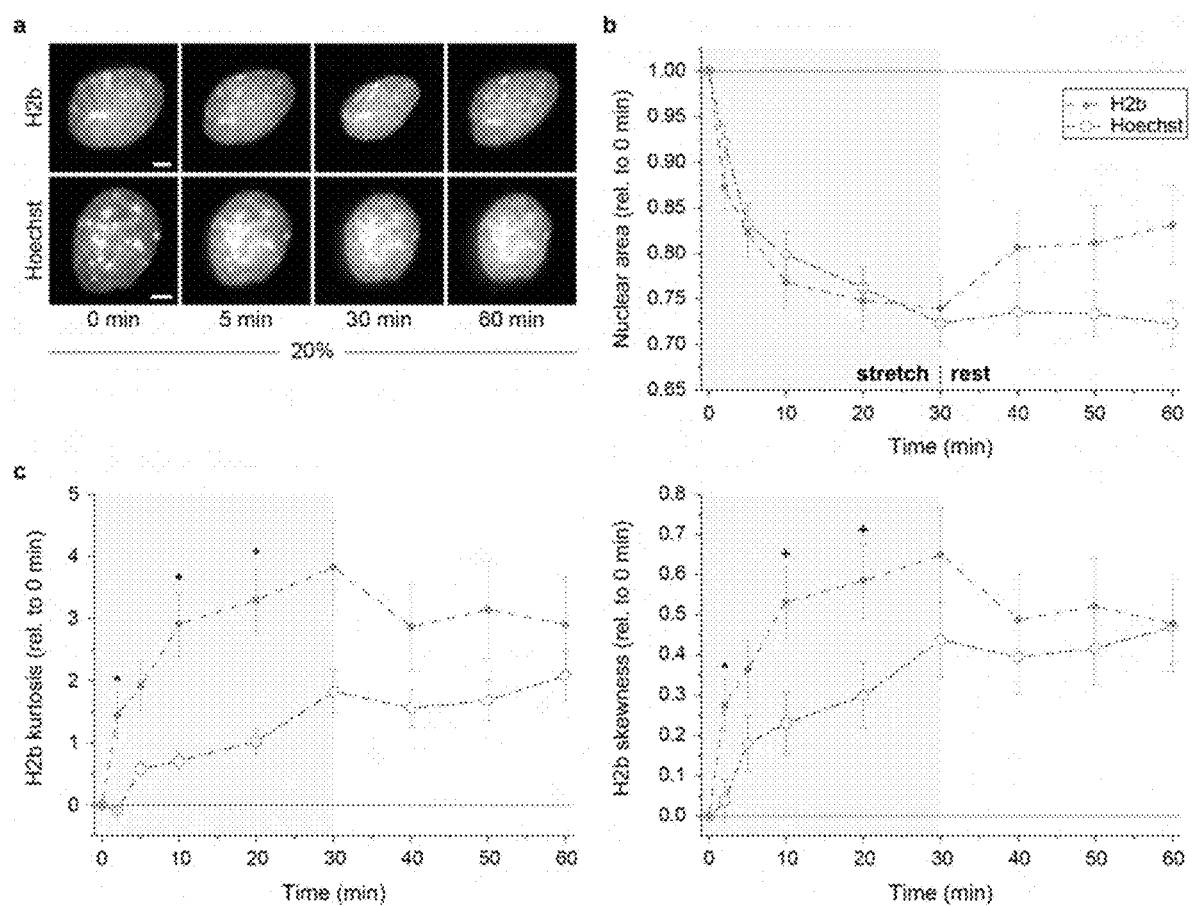
FIG. 9 is a set of images (a) and three graphs (b-d).: Use of chromatin dyes changes nuclear response to high strain cyclic stretch in MSFs. Mouse embryonic skin fibroblasts were exposed to 20% cyclic strain for 30 min followed by 30 min of no stimulation (rest) during which image stacks of nuclei were recorded. To test the influence of chromatin dyes, cells were stained with Hoechst 33342 prior to experiments. (a) Images of nuclei recorded via H2b-eGFP or Hoechst staining; scales=5 μm. (b-d) Relative changes in nuclear area (relative to 0 min) and differences in H2b histogram kurtosis and skewness (compared to 0 min) during stretch routines between DAPI stained or unstained control cells (H2b). Hoechst stained cells showed reduced chromatin condensation during stretch and no regain in nuclear areas during rest; SEM; H2b same as FIG. 3; Hoechst n=10 from 2 exp.; T-test: +p<0.1, * p<0.05.

To test whether chromatin dyes are suitable to investigate mechanosensitive behavior of nuclei, MSFs were subjected to a 20% strain routine after staining with Hoechst (FIG. 9). Stained nuclei showed a similar dynamic of area decline during stretch, but no recovery during the rest period, compared to unstained nuclei. Additionally, measures of chromatin condensation were reduced during stretch, overall suggesting that chromatin dyes do not alter general nuclear sensitivity to stretch but interfere with chromatin reorganization. Together, these results further confirmed that nuclei can respond rapidly (<2 min) to mechanical stimulation, which emphasizes the need for live imaging capabilities to capture these effects. Moreover, it was observed that nuclei of MSFs showed divergent responses to different levels of strain, as nuclear areas were increased and chromatin compaction decreased for low strains and vice versa for high strains.

Figure 4A:
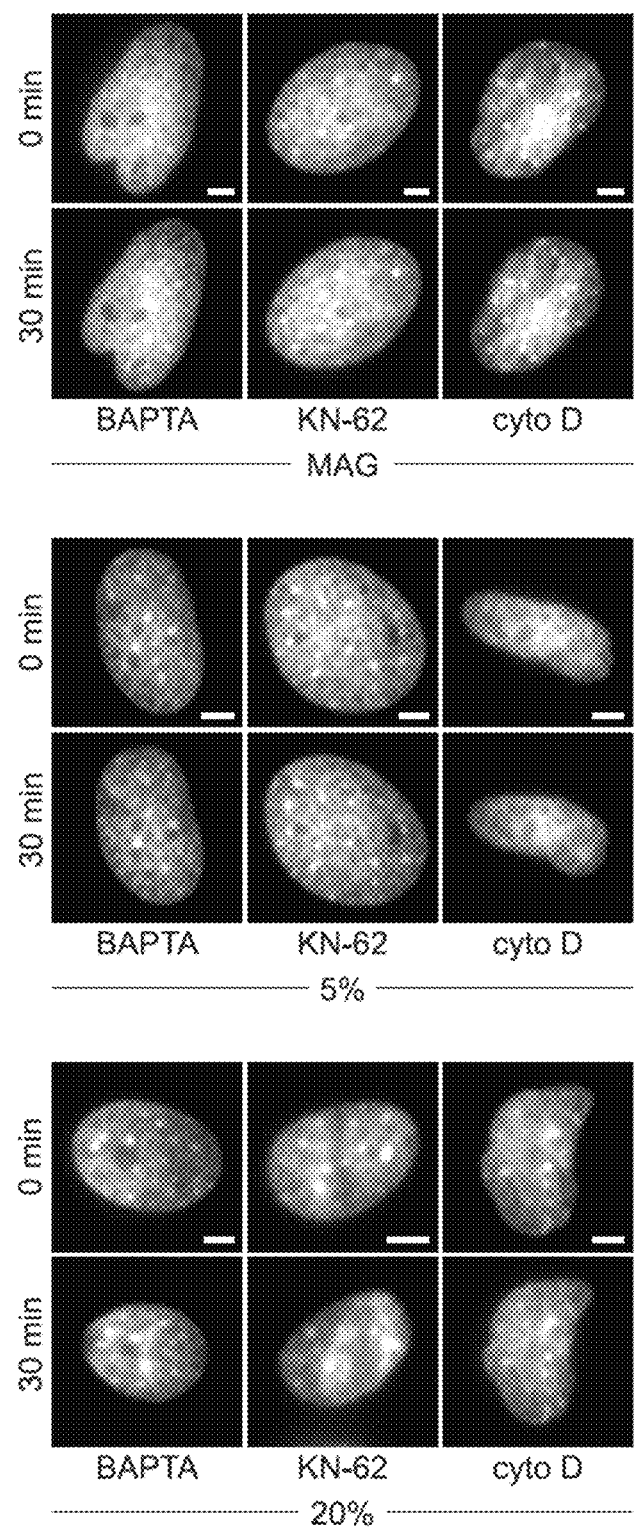
FIG. 4A is a set of images of nuclei recorded via H2b-eGFP before (0 min) or after (30 min) cyclic stretch routines are given; scale bars, 5 μm. The actin skeleton, but not calcium signaling, is required for nuclear responses to high-strain cyclic stretch. MSFs were treated with BAPTA (BP), KN-62 (KN), or cyto D (CD) before being exposed to 30 min of sinusoidal stretch with peak strains of 5, 20, or 0% under the influence of the magnetic field alone (MAG), during which image stacks of nuclei were recorded.
Figure 4B:
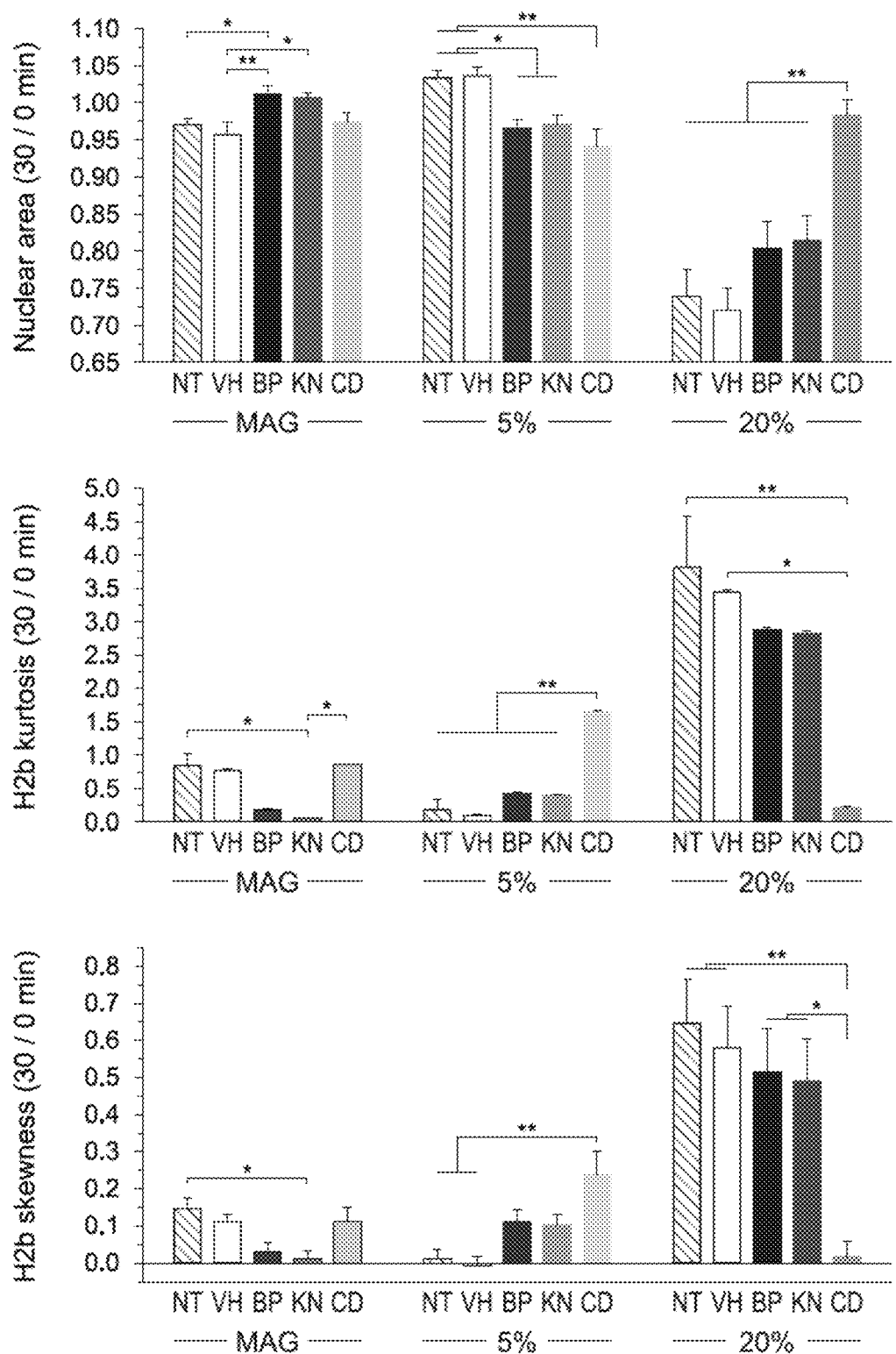
FIG. 4B is a set of three histograms showing CD treatment inhibited changes in nuclear area and chromatin condensation in response to 5 and 20% cyclic stretch compared to NT or VH control cells. BP or KN treatment abrogated the increase in nuclear area and decrease in chromatin condensation after 5% cyclic stretch but had no effect after 20% cyclic stretch; NT cell data same as FIG. 3 for MAG, 5 and 20%, respectively; SEM; n≥15 from three exp.; ANOVA: *p<0.05, **p<0.01.

Example 7—Nuclear Responses of MSFs to Low, but not High Cyclic Strain, are Sensitive to Calcium while Actin is Essential for Both A dichotomous change in nuclear area and chromatin condensation of MSF nuclei in response to high and low cyclic strain was observed. Next, an investigation was conducted to determine whether these responses were mediated through different signaling pathways. Stretch-induced chromatin condensation is dependent on calcium signaling. Treatment of MSFs with BAPTA (BP) to sequester extracellular calcium or KN-62 (KN) to inhibit intracellular calmodulin signaling abrogated the increase in nuclear area and decrease in chromatin condensation observed for nontreated (NT) and vehicle (VH) control cells during 5% cyclic strain routines (FIG. 4). Conversely, calcium inhibition only minorly effected the decrease in nuclear area and increase in chromatin condensation during 20% cyclic strain routines. Both BP and KN treatments interfered with the slight decrease in nuclear area and increase in chromatin condensation observed during static magnetic-field-only routines (MAG).

Further, the actin skeleton is crucial for mechanosensitive signaling and is an important structure for forwarding mechanical cues to the nucleus. Treatment of MSFs with the actin depolymerization drug cytochalasin D (cyto D, CD) also abrogated the increase in nuclear area in response to 5% cyclic strain and distinctly increased chromatin condensation (FIG. 4). Interestingly, cyto D treatment inhibited nuclear shrinkage and chromatin condensation during 20% strain routines. In contrast to calcium inhibition, cyto D treatment showed no effect on MSF nuclei during static magnetic-field-only routines. Together, this data suggested that calcium signaling plays a role during low-strain, but not high-strain, stimulation, whereas an intact actin skeleton was crucial for nuclear responses to any magnitude of stretch.

Figure 5A:
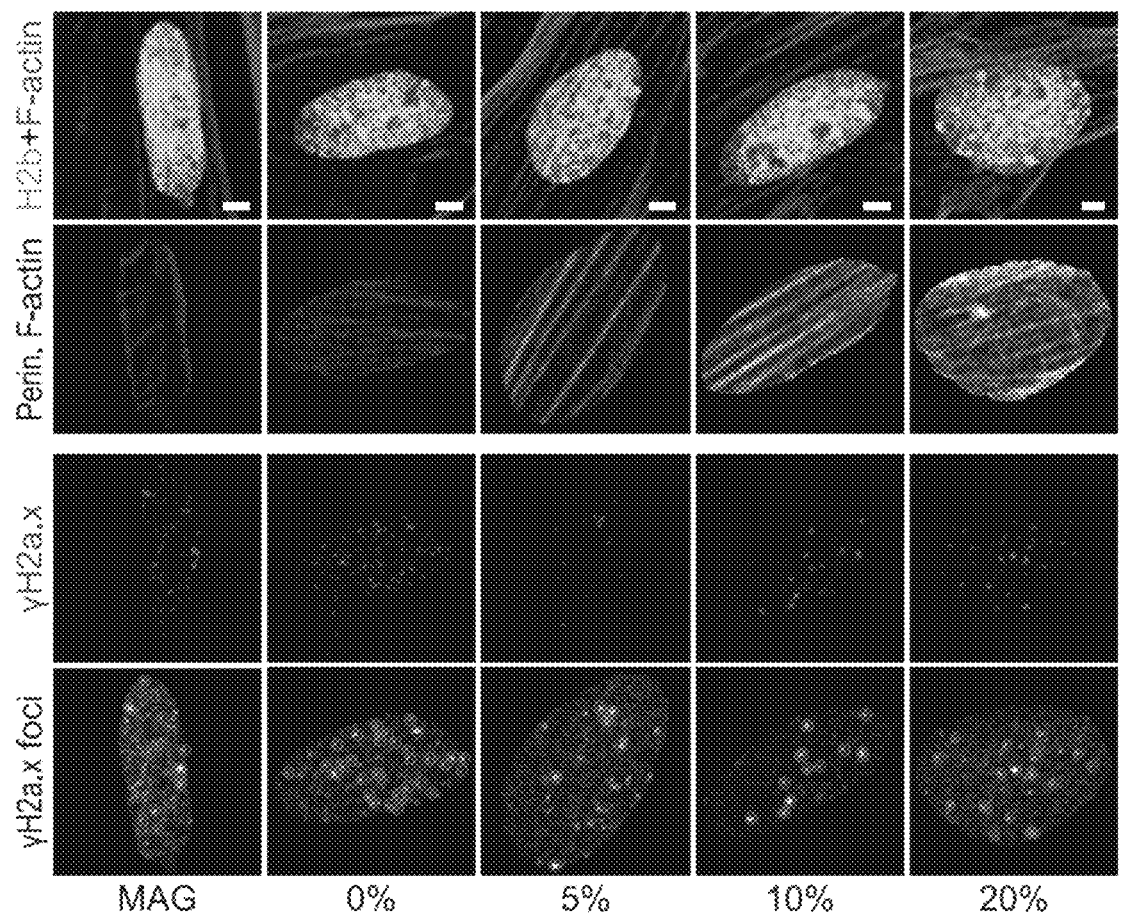
FIG. 5A is a set of stained images of nuclei after stretch routines are given. A custom MATLAB code was used to analyze perinuclear F-actin intensities, using H2b-eGFP as a mask, and to identify γH2a.x foci, as indicated by gray circles. Perinuclear F-actin increases with strain magnitude, and actin depolymerization leads to increased DNA damage after low- and high-strain cyclic stretch. MSFs were exposed to 30 min sinusoidal stretch routines with peak strains of 0, 5, or 20%, or under the influence of the magnetic field alone (MAG), after which cells were stained for γH2a.x, as an indicator of DNA double-strand breaks, and F-actin.
Figure 5B:
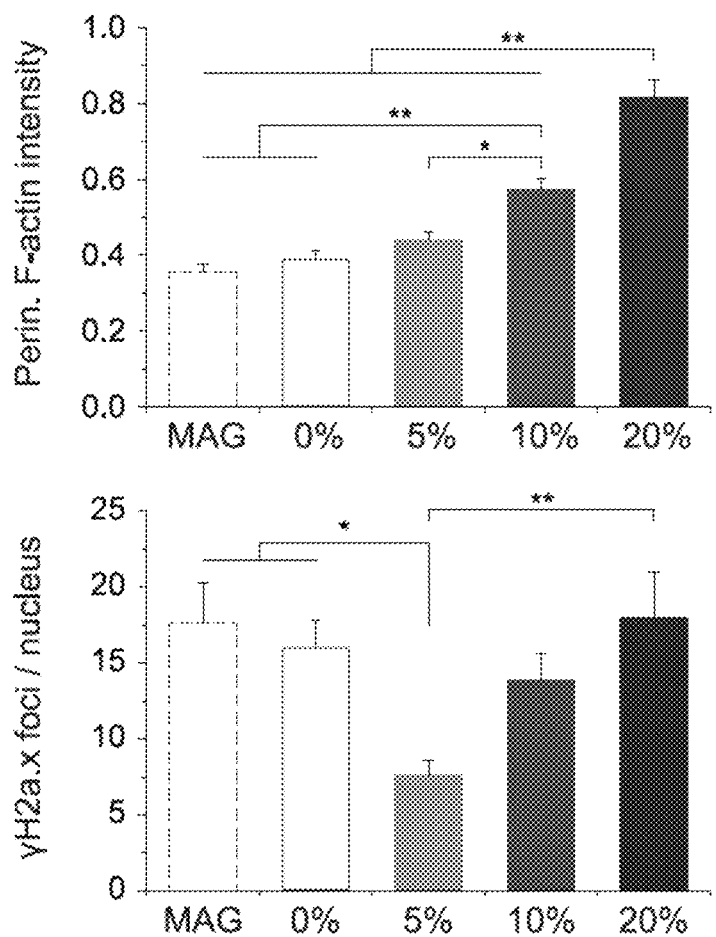
FIG. 5B is a set of two histograms showing perinuclear F-actin intensities and number of γH2a.x foci increased with strain magnitude; however, the highest levels of DNA damage were observed for static control cells.

Example 8—Actin Depolymerization Increases DNA Damage After Low and High Cyclic Strain The calcium-independent shrinkage of nuclear areas suggested that there is a different mechanism for cell behavior under high strain compared with low strain. Cyclic stretch causes DNA damage. To test whether actin-mediated nuclear shrinkage under high loads might be a protective mechanism to prevent DNA damage, MSFs were stained for serine-139 phosphorylated H2a.x (γH2a.x) to indicate DNA double-strand breaks and filamentous actin (F-actin) after 30 min of cyclic stretch. F-actin intensities above the nucleus (perinuclear F-actin) increased with strain magnitudes, being only slightly higher after 5% and twice as high after 20% cyclic strain compared to unstretched (0%) and magnetic-field-only control cells (MAG, FIGS. 5A and 5B). The number of γH2a.x foci per nucleus also increased with increasing levels of strain. DNA damage was as high under static conditions (0%, MAG) as after 20% cyclic stretch.

Figure 5C:
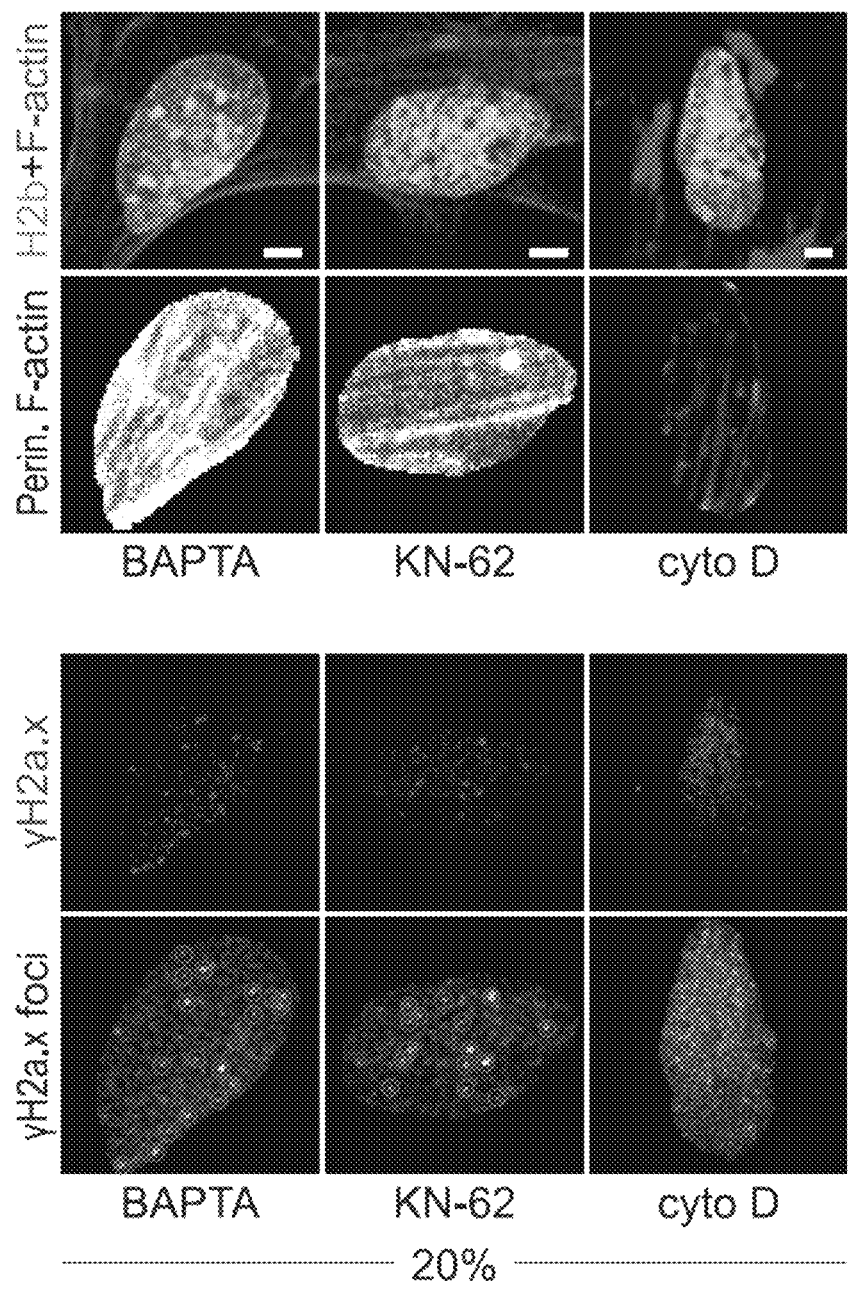
FIG. 5C is a set of images. MSFs were treated with BP, KN, or CD before stretch routines. Inhibition of calcium signaling via BP and KN treatment abrogated increases in perinuclear F-actin intensities in response to 5%, but not 20%, cyclic stretch. Actin depolymerization altered F-actin intensities and showed increased number of foci after both 5 and 20% cyclic stretch, whereas DNA damage was only increased for static magnetic-field-only control cells after inhibition of calcium signaling; SEM; n≥150 from three exp.; ANOVA: *p<0.05, **p<0.01; all scale bars, 5 μm.
Figure 5D:
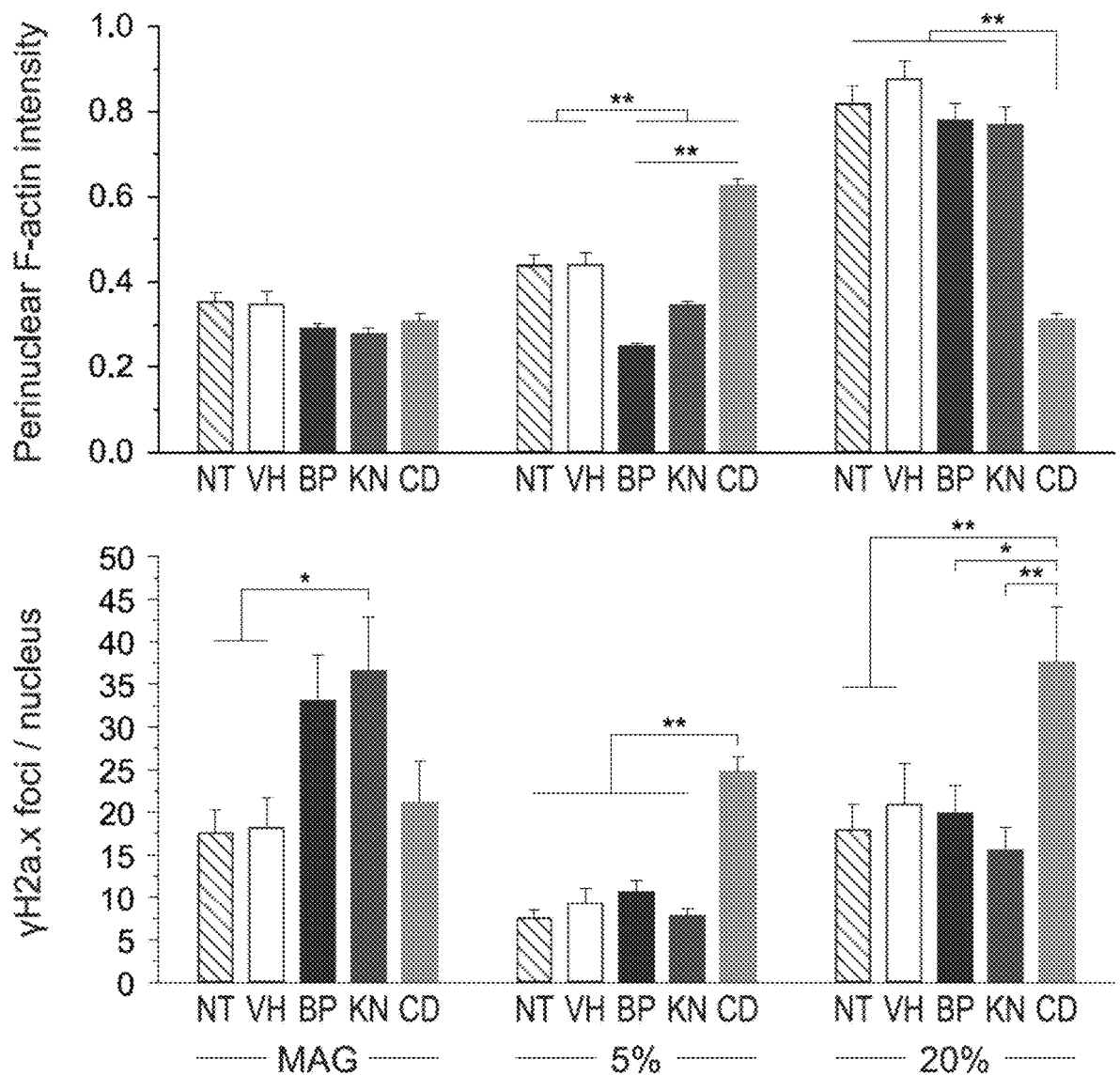
FIG. 5D is a set of two histograms. MSFs were treated with BP, KN, or CD before stretch routines. Inhibition of calcium signaling via BP and KN treatment abrogated increases in perinuclear F-actin intensities in response to 5%, but not 20%, cyclic stretch. Actin depolymerization altered F-actin intensities and showed increased number of foci after both 5 and 20% cyclic stretch, whereas DNA damage was only increased for static magnetic-field-only control cells after inhibition of calcium signaling; SEM; n≥150 from three exp.; ANOVA: *p<0.05, **p<0.01; all scale bars, 5 μm.
Figure 10:
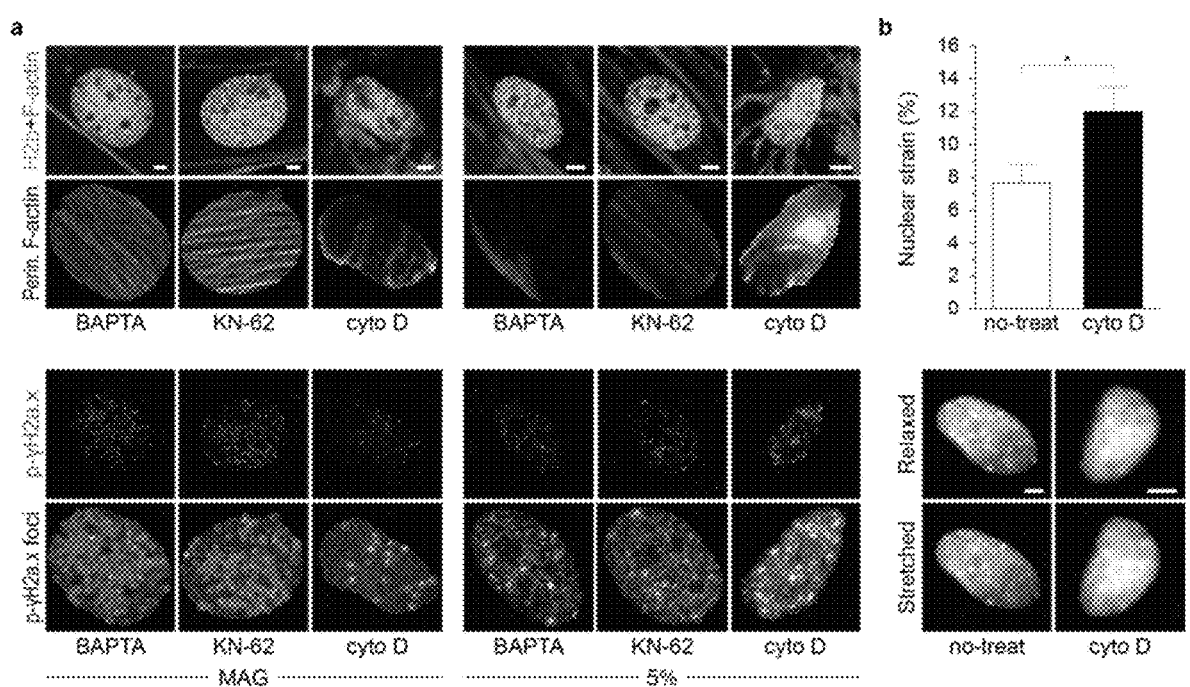
FIG. 10 is a set of images (a) and a graph (b). Cyto D treated MSFs show higher nuclear strain transfer during stretch. Mouse embryonic skin fibroblasts were exposed to 30 min sigmoidal stretch routines after which cells were stained for γH2a.x phosphorylation (p-γH2a.x), indicating DNA double strand breaks, and F-actin. (a) Additional immunostaining data for 5% cyclic stretch and magnetic field only (MAG) routines corresponding the FIG. 5. (b) After 20% cyclic stretch, images of nuclei were recorded under relaxed or stretched conditions to determine strain transfer from the membrane to nuclei. Cells treated with cyto D prior to experiments showed higher nuclear strains compared to untreated (no-treat) control cells; SEM; n=28 from 4 exp.; T-test: * p<0.05; all scales=5 μm.

Similar to nuclear responses, inhibition of calcium signaling via BP or KN abrogated the increase in perinuclear F-actin intensities after 5% cyclic stretch, but not after 20% cyclic stretch, compared to NT or VH control cells (FIGS. 5C, 5D and 10a). Inhibition of calcium signaling increased DNA damage in static magnetic-field-only controls but showed no difference for cells after 5 or 20% cyclic stretch. In contrast, actin depolymerization via cyto D treatment distinctly increased the number of γH2a.x foci per nucleus after 5 and 20% stretch routines but had no effect on cells exposed to the magnetic field alone. Cyto D treatment also showed no effect on perinuclear F-actin intensities after magnetic-field-only routines. The increase in F-actin intensities after 20% cyclic stretch was abrogated in cyto-D-treated MSFs, as would be expected after actin depolymerization. However, F-actin intensities were increased after 5% cyclic stretch in cyto-D-treated MSFs. Judging from the stained images, this was due to an accumulation of small actin filaments at the nuclear periphery (FIG. 10a). Further, imaging of nuclei in relaxed or stretched conditions after 30 min of 20% cyclic strain showed that strains transferred to nuclei were higher in cyto-D-treated cells compared to NT cells (FIG. 10b). Overall, these data showed that perinuclear F-actin increased with increasing levels of strain and actin depolymerization resulted in elevated occurrences of double-strand breaks during high and low cyclic stretch, suggesting that the actin skeleton might play a protective role for the nucleus during high loads.

Figure 6A:
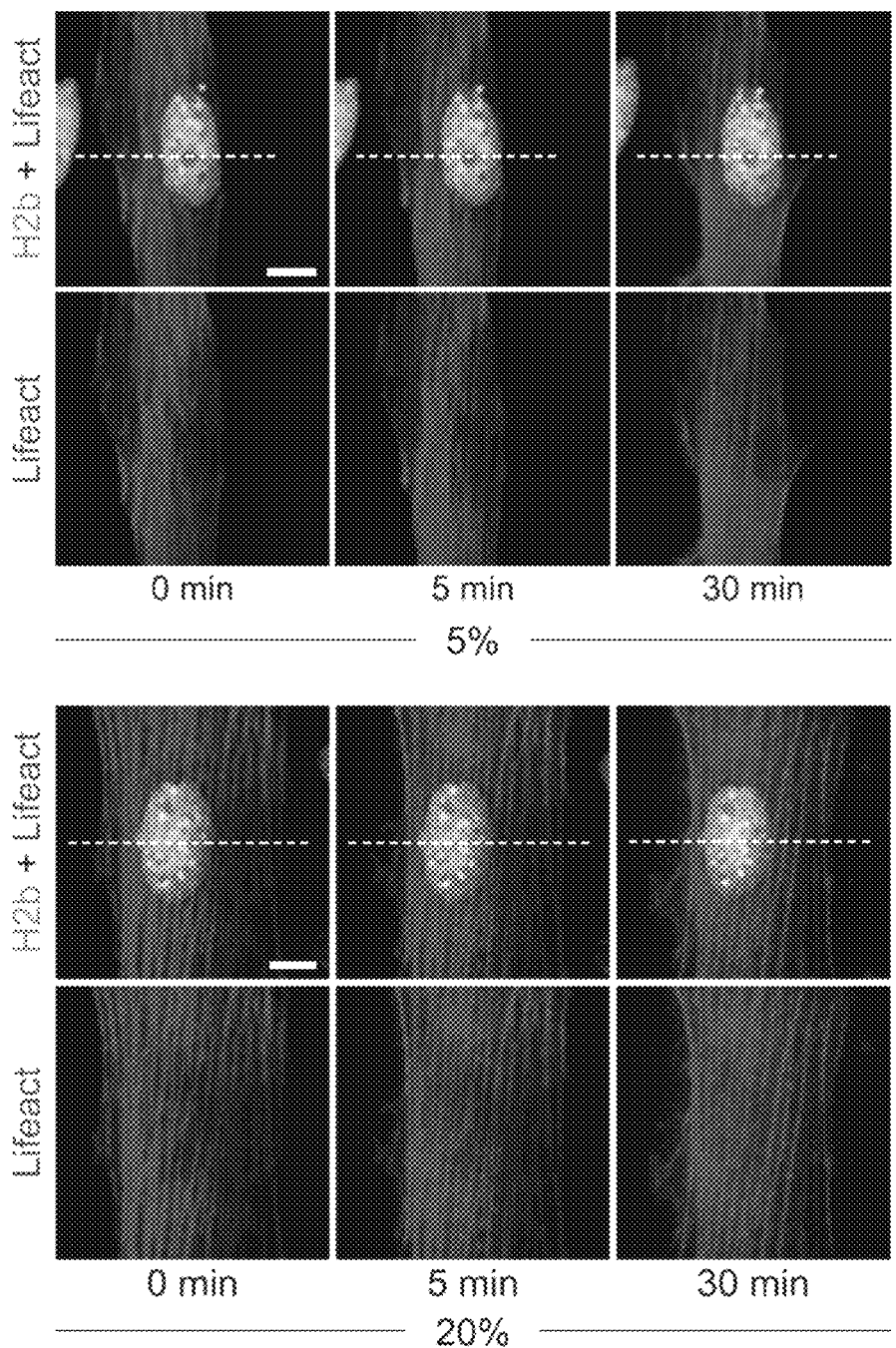
FIG. 6A is a set of images of actin (Lifeact) or nuclei (H2b) recorded during the stretch routine. White dotted lines represent the center location of profile lines in FIG. 6B; scale bars, 10 μm. Lifeact imaging reveals opposing changes of actin reorganization at the cell and nuclear border during low-strain and high-strain cyclic stretch. MSFs were transfected with mRuby-Lifeact-7. The day after, cells were exposed to 30 min of 5 or 20% sinusoidal stretch, followed by 30 min of no stimulation (rest), during which image stacks were recorded.
Figure 6B:
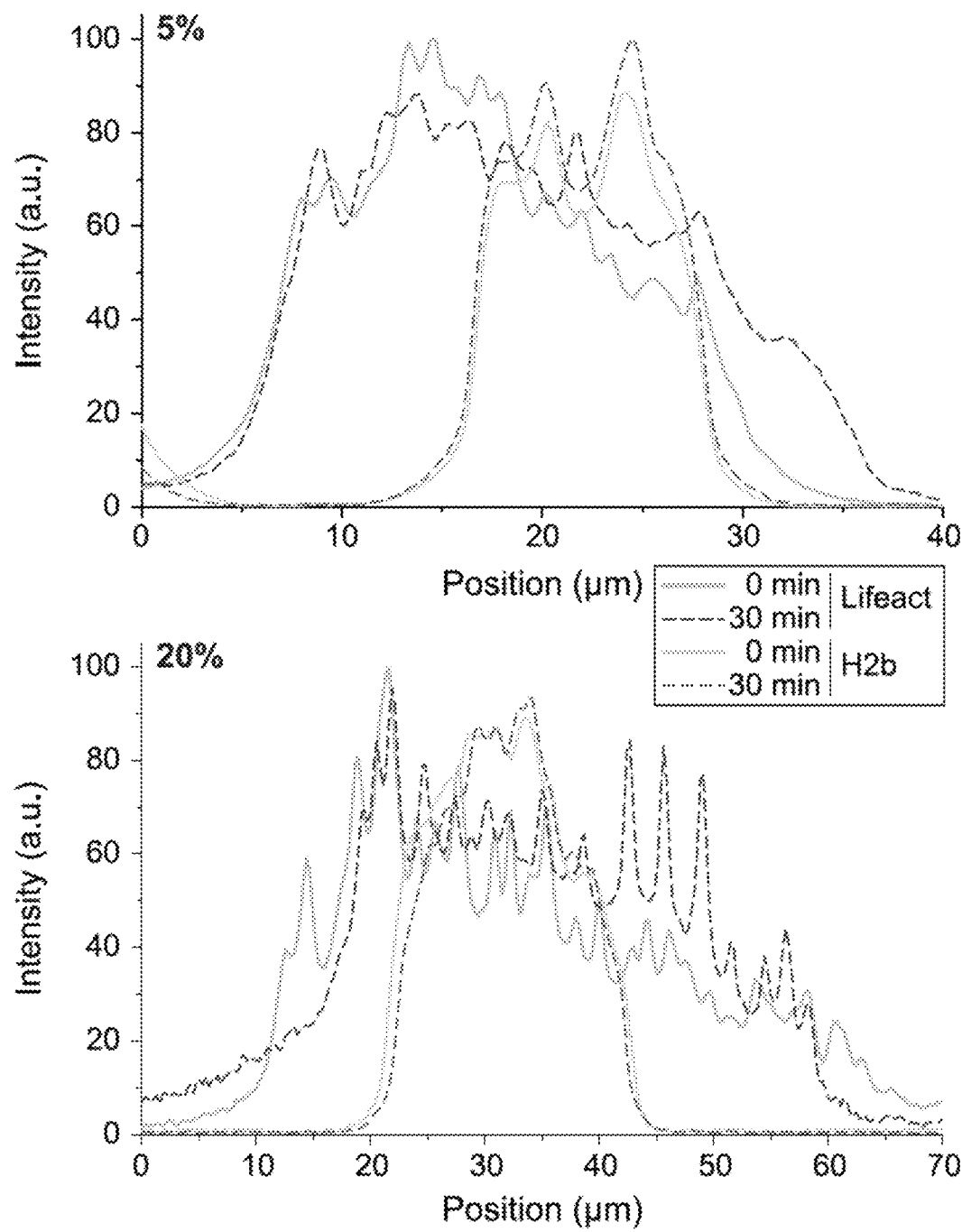
FIG. 6B is a set of two graphs showing projections of actin (Lifeact) and nuclear (H2b) profile lines, as indicated in FIG. 6A, of two example cells before (0 min) or after (30 min) exposure to either 5 or 20% cyclic stretch.
Figure 6C:
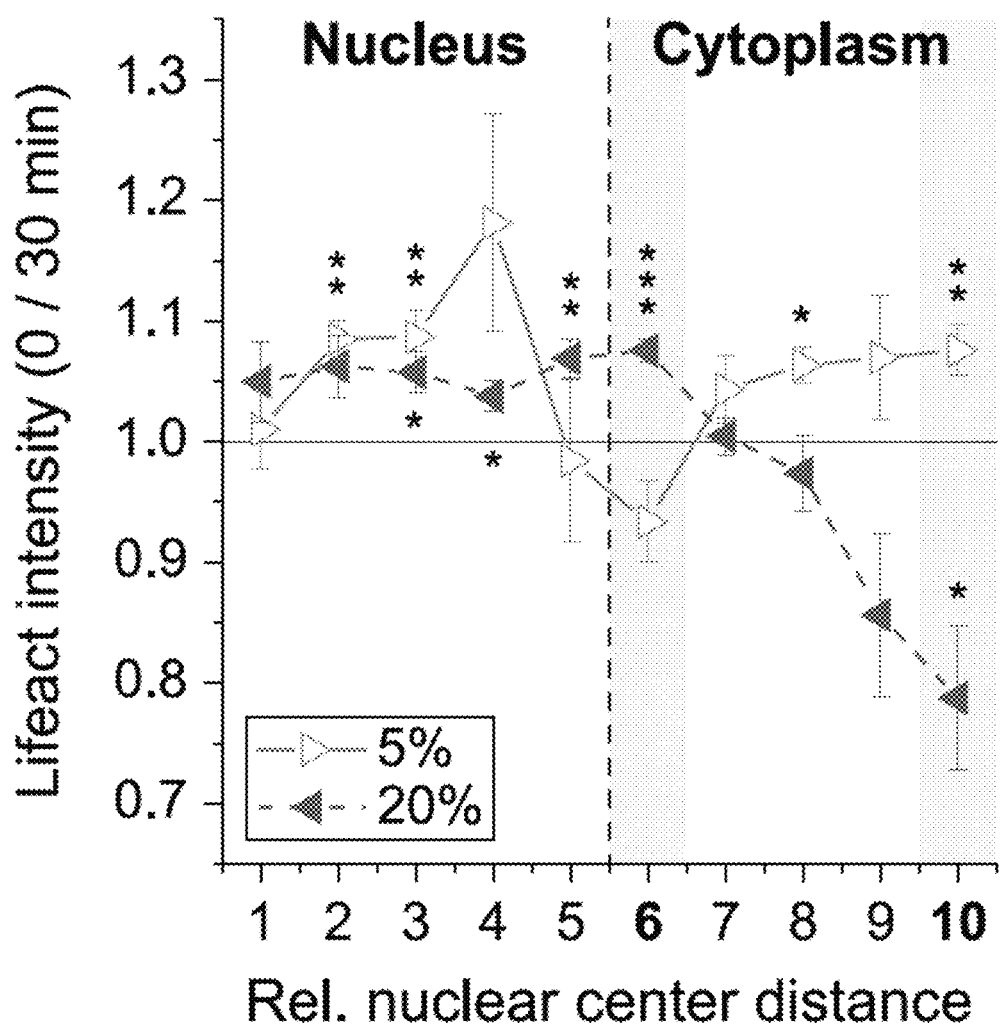
FIG. 6C is a histogram showing changes in Lifeact intensities after 30 min of stretch were binned into relative locations to compare changes in different cells: Bins 1-5 represent intensities from the nuclear center to the inner nuclear border and 6-10 from the nuclear periphery to the cell border. Lifeact intensities shifted from the cell border to the nuclear periphery after 20% cyclic stretch, whereas this trend was inversed after 5% cyclic stretch; SEM; n=6; t-test (vs. 0 min): *p<0.05, p<0.01, *p<0.001.
Figure 6D:
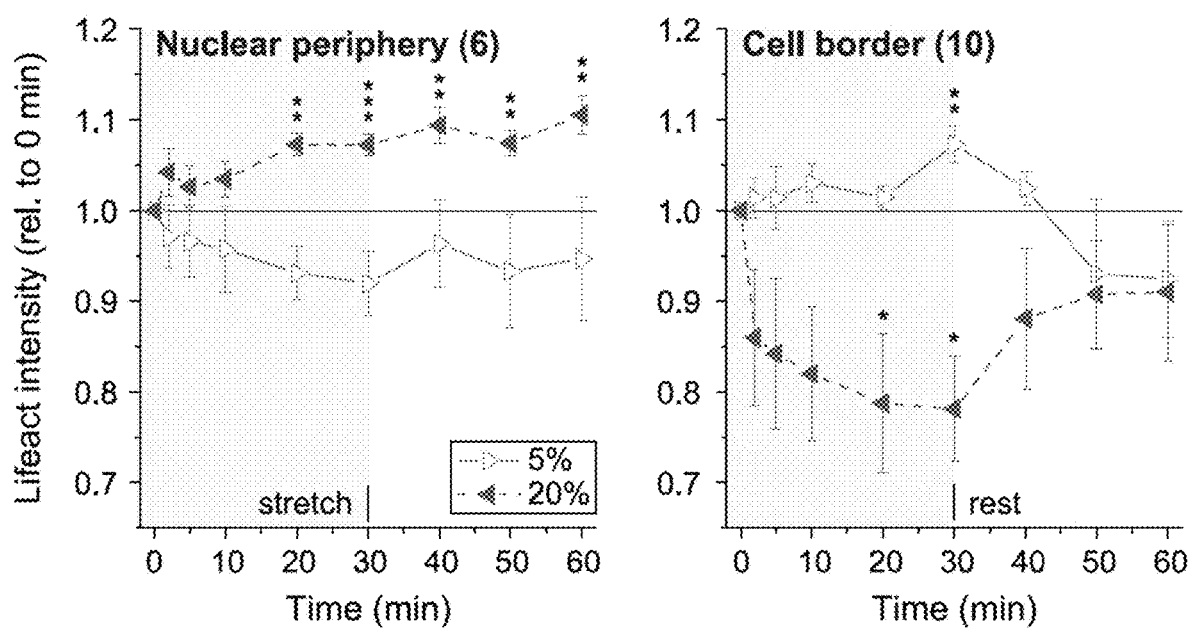
FIG. 6D is a pair of histograms showing changes in Lifeact intensities at the nuclear periphery (bin 6) and cell border (bin 10) over time. Actin reorganization shows dynamics similar to that of nuclear responses; SEM; n=6; t-test (vs. 0 min): *p<0.05, p<0.01, *p<0.001.

Example 9—Live Imaging of Actin Dynamics Revealed Opposing Patterns of Reorganization During Low and High Cyclic Strain Inhibition of actin polymerization abrogated nuclear responses to high- and low-strain routines and increased DNA damage with increasing levels of strain. To further investigate the role of the actin skeleton during stretch-induced changes in cell behavior, MSFs were transfected with a fluorescent F-actin probe (mRuby-Lifeact-7) and acquired image stacks during 30 min of 5 or 20% cyclic stretch followed by 30 min of rest. Analysis of 2-μm-thick profile line projections along the minor axis (perpendicular to F-actin) of two example cells showed that Lifeact intensities shifted toward the cell border after 30 min of 5% stretch, whereas they shifted toward the nucleus after 20% (FIGS. 6A and 6B). To verify these findings in different cells, profile line projections were grouped into bins along their relative distance to the nuclear center, with bins 1-5 representing Lifeact intensities from the nuclear center to the nuclear periphery and bins 6-10 representing intensities from the cytoplasmic site of the nuclear border to the cells border. After 30 min of cyclic stretch, Lifeact intensities were elevated above the nuclear interior (bins 1-4) in cells exposed to both low (5%) and high (20%) levels of strain (FIG. 6C). However, Lifeact intensities were decreased at the nuclear border (bin 6) and increased toward the cell border (bin 10) in cells after 5% of cyclic stretch, whereas intensities were increased at the nuclear border and decreased at the cell border after 20% of cyclic stretch.

Figure 11:
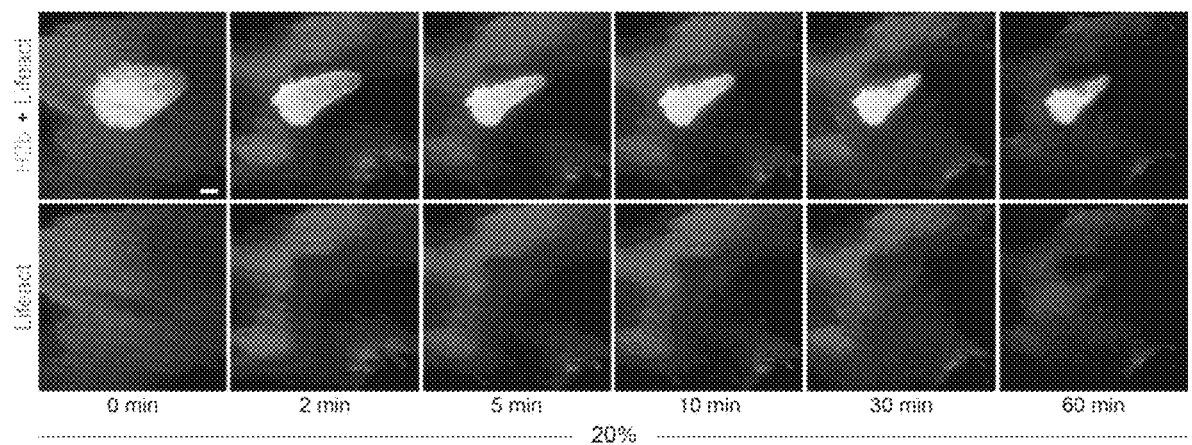
FIG. 11 is a set of images. Lifeact imaging reveals opposing changes of actin reorganization at the cell and nuclear border during low strain and high strain cyclic stretch. Mouse embryonic skin fibroblasts were transfected with mRuby-Lifeact-7 and, 24 h after, cells were exposed to 30 min of 20% sigmoidal stretch, followed by 30 min of no stimulation (rest). Image stacks of actin (Lifeact) or nuclei (H2b) were recorded during the stretch routine. Image series shows a cell undergoing apoptosis shortly after start of the high strain routine; scale=10 μm.

Analysis of Lifeact intensities over time showed a steady decrease or incline of intensities at the nuclear border during the 30 min of stretch in response to low- or high-strain routines, respectively (FIG. 6C). Intensities stayed declined or elevated during rest at the nuclear border. At the cell border, Lifeact intensities declined rapidly in response to 20% strain, continued decreasing during the stretch period, and raised again during the 30 min of rest, albeit staying lower compared to 0 min. This change in Lifeact intensity was noticeably similar to the dynamics of nuclear area shrinkage after high-strain cyclic stretch, suggesting that F-actin rearrangement might mediate the nuclear response through physical interaction. During 5% cyclic stretch, Lifeact intensities slowly increased at the cell border and declined to reduced levels of intensity, compared with 0 min, during rest. In addition, we observed acute nuclear collapse and actin filament disruption in some cells that were exposed to 20% cyclic stretch (FIG. 11). These observations were more pronounced after the rest period, indicating that the cell died through either necrosis or apoptosis. This supported the notion that elevated strains are a challenge for cell survival. Taken together, F-actin also showed opposing patterns of reorganization for different levels of strains, shifting away from the nucleus during low-strain and toward the nucleus during high-strain routines. Furthermore, the dynamics of F-actin rearrangements matched that of nuclear responses. Further considering the results from the DNA damage analysis, this suggested that F-actin might mediate the nuclear shrinkage during high loads through physical confinement to provide protection against stretch-induced DNA damage.

A novel device, referred to as a "TENSCell device", is presented herein to image cells at high magnification during mechanical stimulation. The device was constructed using mainly three-dimensionally printed parts and operated through electromagnetic force. This combination made the device easy to replicate through the means of 3D printing, while also allowing for the precise control of strains. Another benefit of the design is that a simple control circuit is sufficient to control the flow of current to the electromagnetic coil, which further adds to the ease of use. 3D printing also enables the adjustment of the design to fit different microscope stages or to change device specifications. For example, the current maximum strain the device can achieve (~29%) is constrained by the depth of the deformation ring holder and strength of the magnetic field. These specifications can easily be changed to fit the user's needs. Furthermore, at the current configuration equiaxial strain was applied by using a round deformation ring. The geometry of the deformation ring can also be changed to achieve other modes of strain application, e.g., uniaxial.

To test this device, we investigated the response of MSF nuclei to cyclic stretch was investigated. Opposing responses were observed to sinusoidal strain routines with low or high amplitude, as nuclear areas increased and chromatin decompacted for low strains and areas decreased and chromatin condensed for high strains. Cyclic uniaxial stretch (3-15%) has been shown to induce chromatin condensation and nuclear elongation in the direction of stretch in mesenchymal stem cells. Cyclic force application using a magnetic needle has also resulted in chromatin decondensation in HeLa cells. Changes in chromatin compaction can be very rapid (immediate within the time resolution of their method) upon stimulation, similar to our findings here. However, no previous study has reported dichotomous mechanosensitive behavior of nuclei. Mechanosensation has shown that mesenchymal stem cells differentiate in accordance with the stiffness of their environment (becoming osteogenic on stiff, myogenic on medium, and neurogenic on soft substrates), which indicated that cells differentiate between intensities of mechanical cues. Still, the underlying mechanosensitive mechanisms, and whether differences in strain magnitudes are processed through either one pathway in a dose-response manner or are the result of different pathways interacting, is not clear. Here, it is shown that nuclear responses to low-strain cyclic stretch were dependent on calcium signaling, whereas high-strain responses were mostly not. These results suggest that different mechanisms and pathways could be involved in sensing strains of different magnitudes. One could postulate, for example, that stretch-induced calcium channels are sensitive to small loads but cannot distinguish higher loads because their activation threshold might be saturated quickly. In this scenario, the cytoskeleton might be better suited to sense higher loads.

The use of the chromatin dye Hoechst was compared with the endogenous H2b-eGFP tag present in the mice that were used as a source for skin fibroblasts. Intercalating chromatin dyes cause DNA damage, inhibited proliferation, and long-term cell toxicity. However, chromatin dyes are still frequently used for convenience, and information about the use of chromatin dyes for investigating changes in chromatin organization, even on short timescales (<1 h), is limited. In this study, it was observed that Hoechst-stained nuclei responded to cyclic stretch (20%) with a reduction in nuclear area similar to unstained nuclei but showed no relaxation during the subsequent resting period. Reduced chromatin compaction in Hoechst-stained nuclei in response to stretch was also observed. Because chromatin compaction was measured by histogram kurtosis and skewness, this result could also reflect a difference in intensity distribution between labeling chromatin or H2b histones. Despite different attempts, the quantification of chromatin compaction from fluorescence markers is not well established. Our results suggest that the use of intercalating chromatin dyes is not suitable to investigate changes in chromatin organization, even on short timescales, during which cytotoxicity and effects on proliferation might be negligible.

Based on the observation of divergent nuclear behavior, different magnitudes of strain may represent different modes of operation that are associated with specific challenges for the cell. More specifically, low-strain cyclic stretch might mimic baseline physical activity and drive regular cell activity or maintenance. In turn, high loads might be associated with extreme activity or trauma and trigger a protective mechanism. Increased mechanical stress causes DNA damage and trigger apoptosis. Rapid nuclear contraction during high-strain loads might therefore be a mechanism to protect from strain-induced DNA damage.

An increase of DNA double-strand breaks with increased levels of strain was also observed. Interestingly, the number of double-strand break foci was as high in unstretched control cells as after high levels (20%) of cyclic stretch, suggesting that skin fibroblasts cells perform better under dynamic compared to static conditions. Such findings were not reported by most studies that investigated stretch-induced DNA damage. However, these studies only investigated high loads (15-30%) in aberrant cell culture models, which might be less sensitive than primary cells, or focused on oxidative DNA damage in particular. In agreement with our results, it has been reported that ultraviolet-radiation-induced DNA damage (also measure by γH2a.x) was reduced in NIH-3T3 fibroblasts when subjected to 10% cyclic uniaxial stretch. Skin fibroblasts and other types of cells may likely have an optimal performance under low mechanical stimulation because that reflects the conditions they evolved in inside motile organisms. This might have grave implications considering that cells are usually cultured on rigid plastic or glass.

Actin skeleton was observed to be essential for any nuclear response to stretch. Stretch-induced changes in chromatin organization or gene expression can be abrogated after disruption of the actin skeleton. Perinuclear F-actin was observed to increase with strain magnitudes and would therefore not explain the dichotomous nuclear behavior observed for different strains. However, closer investigation of dynamic F-actin reorganization in live cells showed that F-actin shifted away from the nuclear periphery to the cell border during low-strain cyclic stretch and vice versa during high-strain cyclic stretch. Changes in actin reorganization were also observed immediately after cyclic loading (<2 min), particularly during high-strain routines, and their dynamics resembled that of nuclear responses. This suggested an interplay between nucleus and cytoskeleton. Other studies in embryonic fibroblasts also provide strong evidence that the perinuclear actin cap (perinuclear actin above the nucleus) can regulate nuclear morphology in response to mechanical deformation. These studies also suggest that the actin cap acts to protect the nuclear integrity during deformations. The occurrence of double-strand breaks was observed to increase during stretch after actin skeleton disruption. Further supporting this hypothesis, the strain transferred from the silicone membrane to the nucleus was observed to increase after actin depolymerizing via cyto D after 30 min of cyclic stretch. Nuclear strain transfer before cyclic strain application could not be accurately assessed because of the rapid decline in nuclear area of cells held in a stretched position. Depolymerization of actin can inhibit DNA damage repair. Therefore, the question of whether actin reorganization toward the nuclear periphery reduces nuclear strain transfer remains unanswered. Furthermore, it would be interesting to investigate the role of the LINC complex for the interplay between cytoskeleton and nucleus because LINC complex disruption has been shown to inhibit nuclear responses to mechanical cues and interfere with cytoskeleton dynamics.

The magnetic fields used to operate TENSCell device may influence cell behavior. The rare earth magnet was positioned away from the containment well at the opposite side of the piston and had a magnetic field strength of 7 mT at the location of the well (>5 cm from the pole). The distance of the magnet from the well changed only slightly (<1 cm) during stretch and can be considered static (±0.1 mT). In contrast, the electromagnetic coil produces an oscillating field during cyclic stretch with a maximum field strength of ~25.4 mT at the level of the membrane for 20% strain routines (1.0 mT for 5% and ~9.3 mT at offset). Studies have shown that long-term exposure (1-5 days) to static 6 mT magnetic fields can have a significant but moderate effect on cell survival and cell morphology for some of the cell lines investigated. Reviews on the effects of static magnetic fields concluded that effects on cell survival and proliferation were absent or minor regardless of the field strength used (J. Miyakoshi, Effects of static magnetic fields at the cellular level Prog. Biophys. Mol. Biol, 87 (2005), pp. 213-223; S. Ghodbane, A. Lahbib, et al., H. AbdelmelekBioeffects of static magnetic fields: oxidative stress, genotoxic effects, and cancer studies BioMed Res. Int 2013 (2013), p. 602987). However, it should be noted that static magnetic fields can increase the effect of apoptosis-inducing drugs (B. Tenuzzo, A. Chionna, et al., L. DiniBiological effects of 6 mT static magnetic fields: a comparative study in different cell types, Bioelectromagnetics, 27 (2006), pp. 560-577; A. Chionna, M. Dwikat, et al., L. DiniCell shape and plasma membrane alterations after static magnetic fields exposure, Eur. J. Histochem, 47 (2003), pp. 299-308; J. Miyakoshi-Effects of static magnetic fields at the cellular level, Prog. Biophys. Mol. Biol, 87 (2005), pp. 213-223; S. Ghodbane, A. Lahbib, et al., H. AbdelmelekBioeffects of static magnetic fields: oxidative stress, genotoxic effects, and cancer studies, BioMed Res. Int 2013 (2013), p. 602987) that have been related to field-induced changes in calcium uptake (C. Fanelli, S. Coppola, et al., L. GhibelliMagnetic fields increase cell survival by inhibiting apoptosis via modulation of Ca2+ influx, FASEB J, 13 (1999), pp. 95-102; D. J. Panagopoulos, A. Karabarbounis, L. H. MargaritisMechanism for action of electromagnetic fields on cells, Biochem. Biophys. Res. Commun, 298 (2002), pp. 95-102.). This could also pose a possible explanation for the increase in DNA damage in BP- or KN-treated cells. Investigation of the effect of oscillating electromagnetic fields (1-20 mT) has shown moderate effects on cancer proliferation over the duration of 5 or 7 days. These studies used 50 Hz oscillations, which are considered low frequency but are distinctly higher than the 1 Hz used in this study. Research in chick embryos showed that oscillating fields influenced development only upwards of 16 Hz independent of the field strength used. Overall, studies on static and oscillatory magnetic fields observed only minor changes in cell behavior after long time (days) exposure. In this study, no difference in nuclear responses between unstretched control cells exposed to magnetic field routines or cells in the absence of a magnetic field during the 1 h experimental routine was observed. Special caution should be given for the use of pharmacological agents in the presence of a magnetic field, especially when they negatively affect cell viability.

REFERENCES

Engler, A. J., Sen, S., Sweeney, H. L. & Discher, D. E. Matrix elasticity directs stem cell lineage specification. *Cell* 126, 677-89 (2006).

Engler, A. J. et al. Embryonic cardiomyocytes beat best on a matrix with heart-like elasticity: scar-like rigidity inhibits beating. *J. Cell Sci.* 121, 3794-802 (2008).

Pasqualini, F. S. et al. Traction force microscopy of engineered cardiac tissues. *PLoS One* 13, e0194706 (2018).

Hemphill, M. A., Dauth, S., Yu, C. J., Dabiri, B. E. & Parker, K. K. Traumatic brain injury and the neuronal microenvironment: a potential role for neuropathological mechanotransduction. *Neuron* 85, 1177-92 (2015).

del Real, A. et al. Differential analysis of genome-wide methylation and gene expression in mesenchymal stem cells of patients with fractures and osteoarthritis. *Epigenetics* 12, 113-122 (2017).

Thienpont, B. et al. The H3K9 dimethyltransferases EHMT1/2 protect against pathological cardiac hypertrophy. *J. Clin. Invest.* 127, 335-348 (2017).

Zhang, Q. J. et al. The histone trimethyllysine demethylase JMJD2A promotes cardiac hypertrophy in response to hypertrophic stimuli in mice. *J. Clin. Invest.* 121, 2447-2456 (2011).

Carter, D. R. et al. The mechanobiology of articular cartilage development and degeneration. *Clin. Orthop. Relat. Res.* 427, S69-77 (2004).

Jaalouk, D. E. & Lammerding, J. Mechanotransduction gone awry. *Nat. Rev. Mol. Cell Biol.* 10, 63-73 (2009).

Manilal, S., Nguyen, T. M., Sewry, C. A. & Morris, G. E. The Emery-Dreifuss muscular dystrophy protein, emerin, is a nuclear membrane protein. *Hum. Mol. Genet.* 5, 801-808 (1996).

Lampi, M. C. & Reinhart-King, C. A. Targeting extracellular matrix stiffness to attenuate disease: From molecular mechanisms to clinical trials. *Sci. Transl. Med.* 10, eaao0475 (2018).

Huh, D., Torisawa, Y., Hamilton, G. A., Kim, H. J. & Ingber, D. E. Microengineered physiological biomimicry: organs-on-chips. *Lab Chip* 12, 2156-64 (2012).

Rosellini, E. et al. Protein/polysaccharide-based scaffolds mimicking native extracellular matrix for cardiac tissue engineering applications. *J. Biomed. Mater. Res. Part A* 106, 769-781 (2018).

Crisp, M. et al. Coupling of the nucleus and cytoplasm: Role of the LINC complex. *J. Cell Biol.* 172, 41-53 (2006).

Aureille, J., Belaadi, N. & Guilluy, C. Mechanotransduction via the nuclear envelope: a distant reflection of the cell surface. *Curr. Opin. Cell Biol.* 44, 59-67 (2017).

Lee, H. et al. Cytoskeletal prestress regulates nuclear shape and stiffness in cardiac myocytes. *Exp. Biol. Med. (Maywood).* 240, 1543-54 (2015).

Heo, S. J. et al. Biophysical regulation of chromatin architecture instills a mechanical memory in mesenchymal stem cells. *Sci. Rep.* 5, 16895 (2015).

Heo, S.-J. et al. Differentiation alters stem cell nuclear architecture, mechanics, and mechano-sensitivity. *Elife* 5, (2016).

Liu, J. et al. Caspase-3-mediated cyclic stretch-induced myoblast apoptosis via a Fas/FasL-independent signaling pathway during myogenesis. *J. Cell. Biochem.* 107, 834-44 (2009).

Guilluy, C. et al. Isolated nuclei adapt to force and reveal a mechanotransduction pathway in the nucleus. *Nat. Cell Biol.* 16, 376-381 (2014).

Tajik, A. et al. Transcription upregulation via force-induced direct stretching of chromatin. *Nat. Mater.* (2016). doi:10.1038/nmat4729.

Uzer, G. et al. Cell mechanosensitivity to extremely low-magnitude signals is enabled by a LINCed nucleus. *Stem Cells* 33, 2063-2076 (2015).

Iyer, K. V., Pulford, S., Mogilner, A. & Shivashankar, G. V. Mechanical activation cells induces chromatin remodeling preceding MKL nuclear transport. *Biophys. J.* 103, 1416-1428 (2012).

Le, H. Q. et al. Mechanical regulation of transcription controls Polycomb-mediated gene silencing during lineage commitment. *Nat. Cell Biol.* 18, 864-875 (2016).

Bartalena, G. et al. A novel method for assessing adherent single-cell stiffness in tension: design and testing of a substrate-based live cell functional imaging device. *Biomed. Microdevices* 13, 291-301 (2011).

Harshad, K. et al. An electromagnetic cell-stretching device for mechanotransduction studies of olfactory ensheathing cells. *Biomed. Microdevices* 18, 1-10 (2016).

Toume, S., Gefen, A. & Weihs, D. Printable low-cost, sustained and dynamic cell stretching apparatus. *J. Biomech.* 49, 1336-1339 (2016).

Deguchi, S., Kudo, S., Matsui, T. S., Huang, W. & Sato, M. Piezoelectric actuator-based cell microstretch device with real-time imaging capability. *AIP Adv.* 5, 1-6 (2015).

Huang, L., Mathieu, P. S. & Helmke, B. P. A Stretching Device for High-Resolution Live-Cell Imaging. *Ann. Biomed. Eng.* 38, 1728-1740 (2010).

Shao, Y. et al. Uniaxial cell stretching device for live-cell imaging of mechanosensitive cellular functions. *Rev. Sci. Instrum.* 84, 1-8 (2013).

Chalut, K. J. et al. Chromatin decondensation and nuclear softening accompany Nanog downregulation in embryonic stem cells. *Biophys. J.* 103, 2060-70 (2012).

Martiel, J.-L. et al. Measurement of cell traction forces with ImageJ. *Methods Cell Biol.* 125, 269-87 (2015).

Herbomel, G. et al. Wavelet transform analysis of chromatin texture changes during heat shock. *J. Microsc.* 262, 295-305 (2016)

Upadhyay, D., Correa-Meyer, E., Sznajder, J. I. & Kamp, D. W. FGF-10 prevents mechanical stretch-induced alveolar epithelial cell DNA damage via MAPK activation. *Am. J. Physiol. Lung Cell. Mol. Physiol.* 284, L350-9 (2003).

Mayr, M., Hu, Y., Hainaut, H. & Xu, Q. Mechanical stress-induced DNA damage and rac-p38MAPK signal pathways mediate p53-dependent apoptosis in vascular smooth muscle cells. *FASEB J.* 16, 1423-5 (2002).

Rogakou, E. P., Pilch, D. R., Orr, A. H., Ivanova, V. S. & Bonner, W. M. DNA Double-stranded Breaks Induce Histone H2AX Phosphorylation on Serine 139. *J. Biol. Chem.* 273, 5858-5868 (1998).

Khatau, S. B. et al. A perinuclear actin cap regulates nuclear shape. *Proc. Natl. Acad. Sci.* 106, 19017-19022 (2009).

Tenuzzo, B. et al. Biological effects of 6 mT static magnetic fields: a comparative study in different cell types. *Bioelectromagnetics* 27, 560-77 (2006).

Chionna, A. et al. Cell shape and plasma membrane alterations after static magnetic fields exposure. *Eur. J. Histochem.* 47, 299-308 (2003).

Miyakoshi, J. Effects of static magnetic fields at the cellular level. *Prog. Biophys. Mol. Biol.* 87, 213-223 (2005).

Ghodbane, S., Lahbib, A., Sakly, M. & Abdelmelek, H. Bioeffects of static magnetic fields: oxidative stress, genotoxic effects, and cancer studies. *Biomed Res. Int.* 2013, 602987 (2013).

Fanelli, C. et al. Magnetic fields increase cell survival by inhibiting apoptosis via modulation of $Ca^{2+}$ influx. *FASEB J.* 13, 95-102 (1999).

Panagopoulos, D. J., Karabarbounis, A. & Margaritis, L. H. Mechanism for action of electromagnetic fields on cells. *Biochem. Biophys. Res. Commun.* 298, 95-102 (2002).

Huang, L., Dong, L., Chen, Y., Qi, H. & Xiao, D. Effects of sinusoidal magnetic field observed on cell proliferation, ion concentration, and osmolarity in two human cancer cell lines. Electromagn. Biol. Med. 25, 113-26 (2006).

Pirozzoli, M. C. et al. Effects of 50 Hz electromagnetic field exposure on apoptosis and differentiation in a neuroblastoma cell line. Bioelectromagnetics 24, 510-516 (2003).

Juutilainen, J. & Saali, K. Development of chick embryos in 1 Hz to 100 kHz magnetic fields. Radiat. Environ. Biophys. 25, 135-40 (1986).

Definitions

As used throughout the entire application, the terms "a" and "an" are used in the sense that they mean "at least one", "at least a first", "one or more" or "a plurality" of the referenced components or steps, unless the context clearly dictates otherwise. For example, the term "a cell" includes a plurality of cells, including mixtures thereof.

The term "and/or" wherever used herein includes the meaning of "and", "or" and "all or any other combination of the elements connected by said term".

The term "about" or "approximately" as used herein means within 20%, preferably within 10%, and more preferably within 5% of a given value or range.

Other than in the operating examples, or unless otherwise expressly specified, all of the numerical ranges, amounts, values and percentages such as those for amounts of materials, times and temperatures of reaction, ratios of amounts, values for molecular weight (whether number average molecular weight ("$M_n$") or weight average molecular weight ("$M_w$"), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

As used herein, the term "comprising" is intended to mean that the products, compositions and methods include the referenced components or steps, but not excluding others. "Consisting essentially of" when used to define products, compositions and methods, shall mean excluding other components or steps of any essential significance. Thus, a composition consisting essentially of the recited components would not exclude trace contaminants and pharmaceutically acceptable carriers. "Consisting of" shall mean excluding more than trace elements of other components or steps.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

All references cited in the present application are incorporated in their entirety herein by reference to the extent not inconsistent herewith.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

TABLE 1

Component list of the stretch device. Pricing for the device depends on materials costs and 3D printing, including cost of printing material, density of the print, and facility charges.

| Component | Material | Vendor | Quantity |
| --- | --- | --- | --- |
| Main Chamber (Ob) | VeroClear | Computer Aided Techn. | 1 |
| Membrane Ring (Ob) | VeroClear | Computer Aided Techn. | 1 |
| Holding Clips (Ob) | VeroClear | Computer Aided Techn. | 3 |
| Piston (uP) | ABS+ | Computer Aided Techn. | 1 |
| Deformation Ring Holder (uP) | ABS+ | Computer Aided Techn. | 1 |
| Electromagnet Case (uP) | ABS+ | Computer Aided Techn. | 1 |
| Slider Tube (uP) | ABS+ | Computer Aided Techn. | 1 |
| Deformation Ring | Delrin | Computer Aided Techn. | 1 |
| Electromagnetic Coil | Cooper Wire | NA | 10 m |
| Permanent Rare Earth Magnet | Neodymium | SuperMagnetMan | 1 |
| Slider Rails | Aluminum | Igus | 3 |
| Slider Carriages | NA | Igus | 3 |
| Arduino Microcontroller | NA | SparkFun Electronics | 1 |
| H-Bridge | NA | RB-Cyt-132, RobotShop | 1 |

What is claimed is:

1. A device to apply an equiaxial stretch to a thin elastic membrane comprising:
   a stretch chamber comprising a cylindrical chamber having opposing ends forming a cylinder, a thin elastic membrane affixed to an end of the cylinder, an adhesion factor to facilitate adhesion of cells to the membrane, and a compliant silicon containment ring affixed or integral to the thin elastic membrane, wherein the containment ring is adapted to contain a cell or cells on the thin elastic membrane;
   a piston capable of axial movement upon the application of a controlled force to the piston, wherein the stretch chamber is connected to the piston whereby movement of the piston results in axial movement of the cylindrical chamber;
   a static deformation ring in contact with the thin elastic membrane, wherein the diameter of the deformation ring is smaller than the diameter of the end of the cylindrical chamber, whereby axial movement of the cylindrical chamber connected to the piston results in stretching of the thin elastic membrane across the point of contact between the deformation ring and the thin elastic membrane.

2. The device to apply an equiaxial stretch to a thin elastic membrane according to claim 1 further comprising:
   a magnet connected to the piston;
   an electromagnet in communication with a power source, wherein application of an electrical current to the electromagnet causes axial movement of the piston.

3. A device to apply an equiaxial stretch to a thin elastic membrane comprising:

a piston capable of axial movement upon the application of a controlled force to the piston;

a cylindrical chamber connected to the piston, wherein movement of the piston results in axial movement of the cylindrical chamber and wherein the cylindrical chamber has opposing ends ;

a thin elastic membrane affixed across an end of the cylindrical chamber;

a static deformation ring in contact with the thin elastic membrane, wherein the diameter of the deformation ring is smaller than the diameter of the end of the cylindrical chamber, whereby axial movement of the cylindrical chamber connected to the piston results in stretching of the thin elastic membrane across the point of contact between the deformation ring and the thin elastic membrane.

4. The device to apply an equiaxial stretch to a thin elastic membrane according to claim 3 wherein the thin elastic membrane is coated with an adhesion factor to facilitate adhesion of cells to the membrane.

5. The device to apply an equiaxial stretch to a thin elastic membrane according to claim 3 wherein the thin elastic membrane is transparent or translucent, wherein cells adherent to the thin elastic membrane can be visualized by light microscopy through the thin elastic membrane.

6. The device to apply an equiaxial stretch to a thin elastic membrane according to claim 3 further comprising a compliant elastic containment ring affixed or integral to the thin elastic membrane, wherein the containment ring is adapted to contain a cell or cells on the thin elastic membrane during culture of the cell or cells.

7. The device to apply an equiaxial stretch to a thin elastic membrane according to claim 3 wherein the thin elastic membrane is a silicone elastomer membrane.

8. The device to apply an equiaxial stretch to a thin elastic membrane according to claim 3 wherein the static deformation ring is a tapered circular ring having opposing ends and a narrow edge at one end of the ring wherein the narrow edge of the taper is in contact with the thin elastic membrane.

9. The device to apply an equiaxial stretch to a thin elastic membrane according to claim 3 further comprising:

a magnet connected to the piston;

an electromagnet in communication with a power source, wherein application of an electrical current to the electromagnet causes axial movement of the piston.

10. The device to apply an equiaxial stretch to a thin elastic membrane according to claim 9 further comprising a slider tube in static relation to the electromagnet wherein the slider tube receives the piston and guides the axial movement of the piston received therein.

11. The device to apply an equiaxial stretch to a thin elastic membrane according to claim 10 further comprising a plurality of slider rails with cooperative slider carriages between the slider tube and the piston to provide friction-reduced axial movement of the piston.

12. The device to apply an equiaxial stretch to a thin elastic membrane according to claim 9 wherein the magnet connected to the piston is a permanent rare earth magnet.

13. The device to apply an equiaxial stretch to a thin elastic membrane according to claim 9 wherein the electromagnet has an electromagnetic coil and when current is applied to the electromagnetic coil, a resulting electromagnetic field lifts the piston up or pushes the piston down depending on the orientation of the magnetic field and wherein the electromagnetic field is controlled through an Arduino microprocessor that modulates intensity and the direction of current from a constant DC power source.

14. The device to apply an equiaxial stretch to a thin elastic membrane according to claim 3 further comprising a deformation ring holder adapted to hold the deformation ring a selected distance from an objective of a microscope.

* * * * *